United States Patent [19]
Fuji

[11] Patent Number: 5,365,505
[45] Date of Patent: Nov. 15, 1994

[54] INFORMATION REPRODUCING DEVICE

[75] Inventor: Hiroshi Fuji, Nara, Japan

[73] Assignee: Sharp Kabushiki Kaisha, Osaka, Japan

[21] Appl. No.: 960,300

[22] Filed: Oct. 13, 1992

Related U.S. Application Data

[63] Continuation of Ser. No. 580,946, Sep. 11, 1992, abandoned.

[30] Foreign Application Priority Data

Sep. 14, 1989 [JP] Japan .................................. 1-239014

[51] Int. Cl.$^5$ .................................................. G11B 7/00
[52] U.S. Cl. .......................................... 369/59; 360/46
[58] Field of Search ............................................ 369/59

[56] References Cited

U.S. PATENT DOCUMENTS 4,194,223 3/1980 Marino .

Primary Examiner—Vincent P. Canney

[57] ABSTRACT

An information reproducing device in accordance with the present invention has at least a differentiating zero-cross detection circuit that differentiates analog reproduced signals that were detected as a light beam was irradiated on an information recording medium whereon information is digitally recorded, that generates differentiated signals, and generates binary zero-cross signals by comparing the differentiated signals and its zero level, a gate generating circuit that generates binary gate signals in accordance with the variation of the analog reproduced signals, a flip-flop that generates binary reproduced signals based on the comparison of the zero-cross signals and the gate signals, and an equalizer that emphasizes the high-frequency components of the analog reproduced signals. Provision is made such that the equalizer is installed ahead of the gate generating circuit. The equalizer thus generates gate signals that correspond accurately to the variation of the analog reproduced signals, thereby permitting data recorded on the information recording medium to be reproduced accurately.

15 Claims, 34 Drawing Sheets

FIG. 15
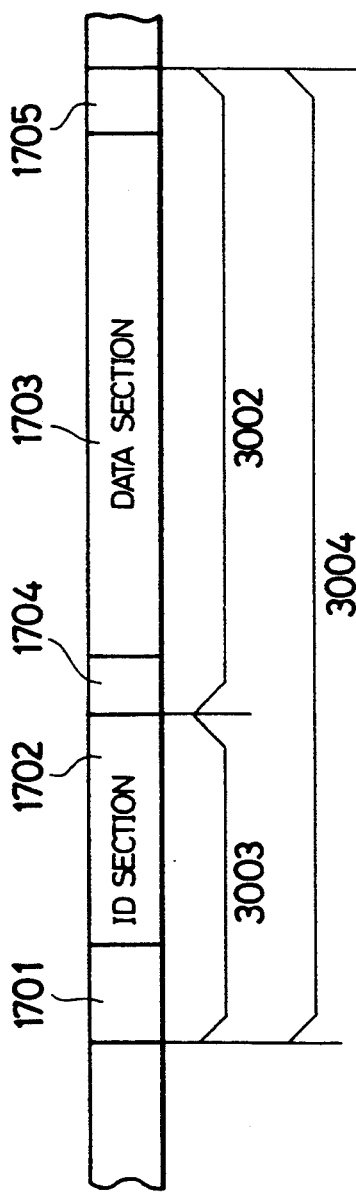
(a) SECTOR FORMAT
(b) HIGH-FREQUENCY SUPERPOSITION SWITCH SIGNAL 1812 
(c) MODULATED DATA 1310 
(d) LIGHT LEVEL 1910 

FIG. 19
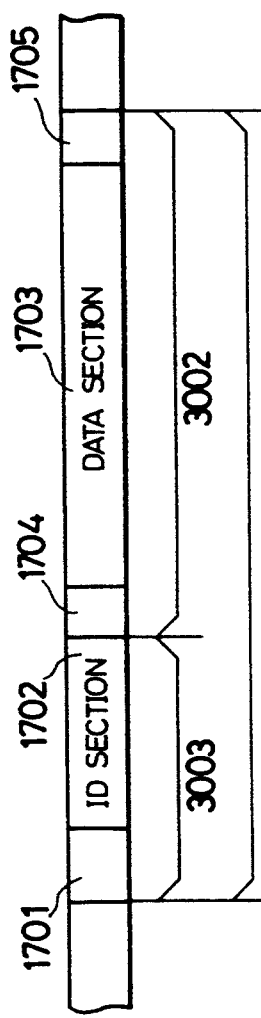
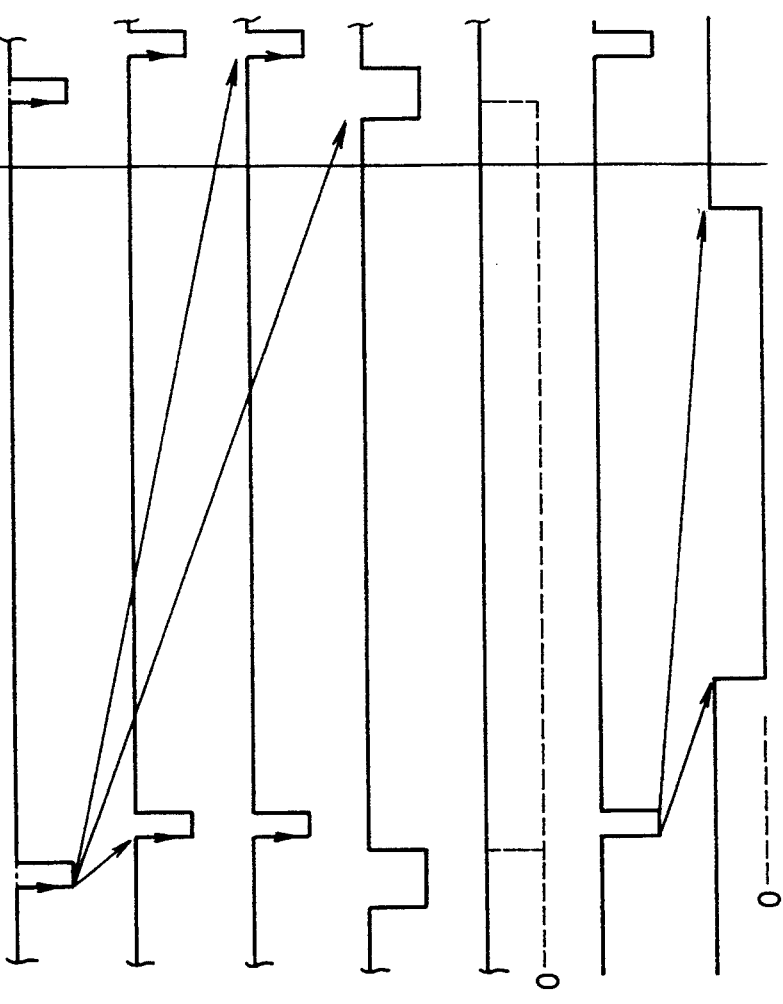
(a) SECTOR FORMAT
(b) SECTOR MARK DETECTION SIGNAL 2110
(c) COUNTER OUTPUT SIGNAL 2111
(d) TIMER CIRCUIT OUTPUT SIGNAL 2112
(e) WINDOW GENERATING CIRCUIT OUTPUT SIGNAL 2114
(f) TIMING JUDGE SIGNAL 2115
(g) REFERENCE TIMING SIGNAL 1510
(h) DATA SECTION JUDGEMENT SIGNAL 2116

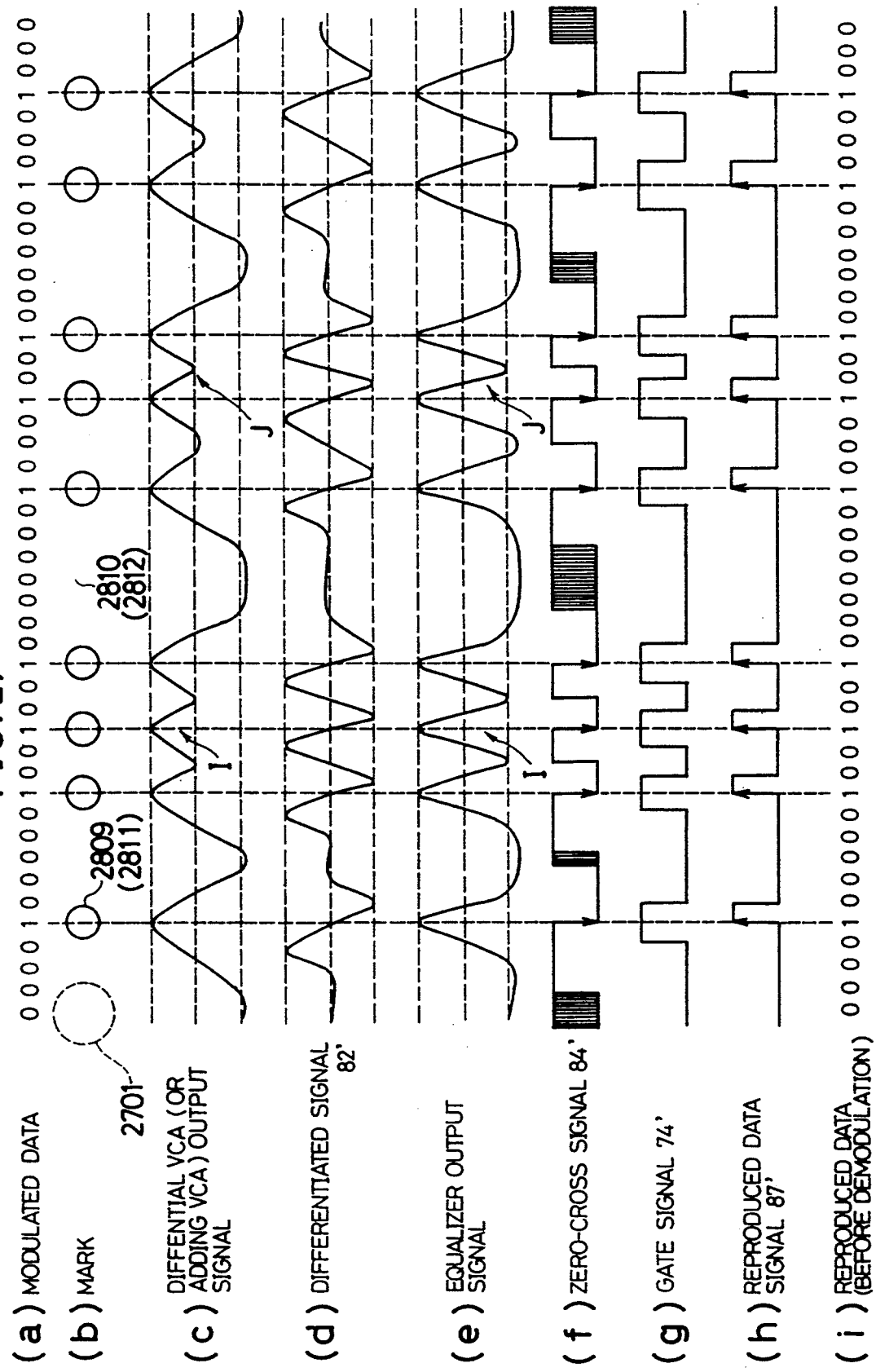

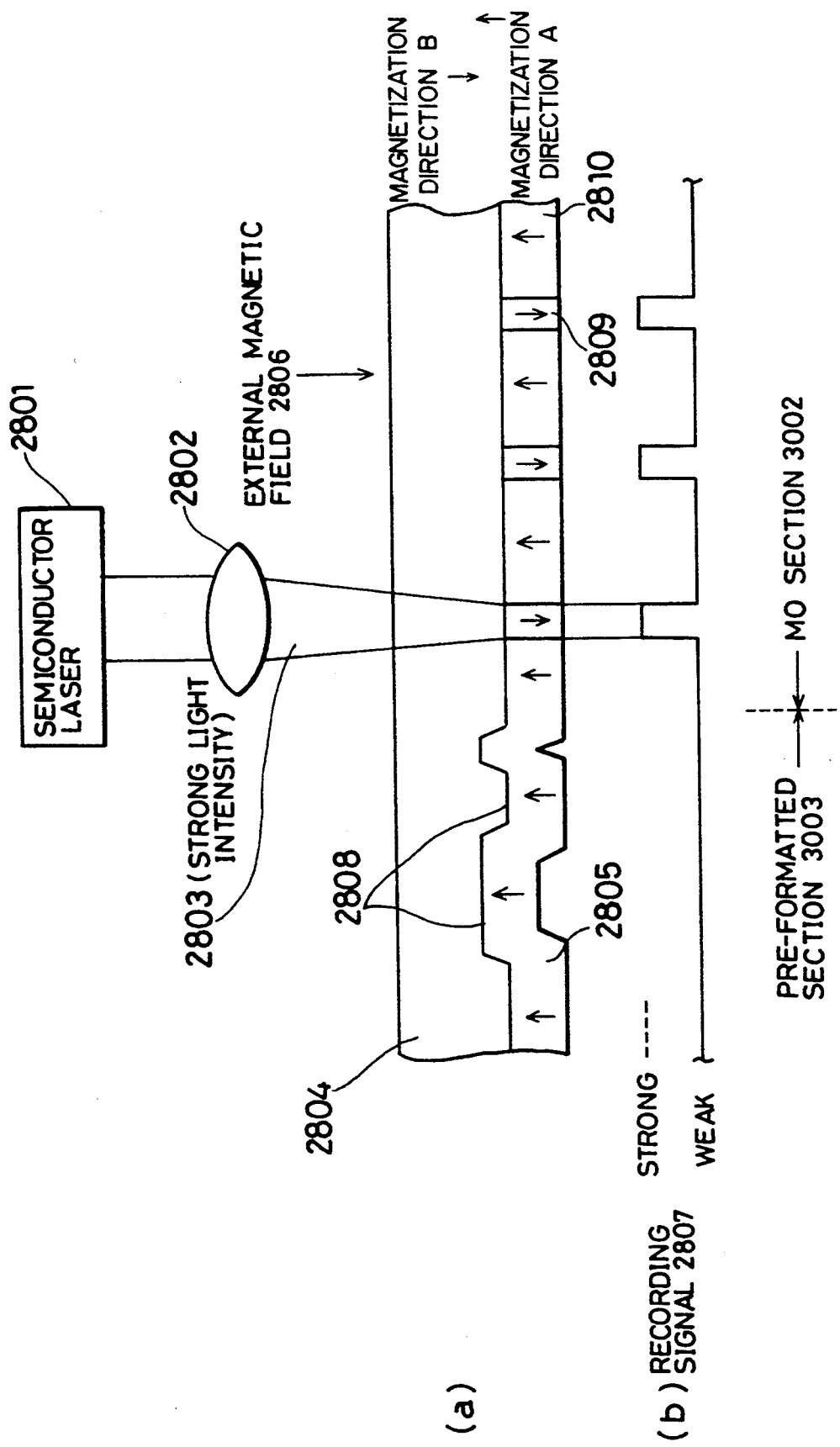

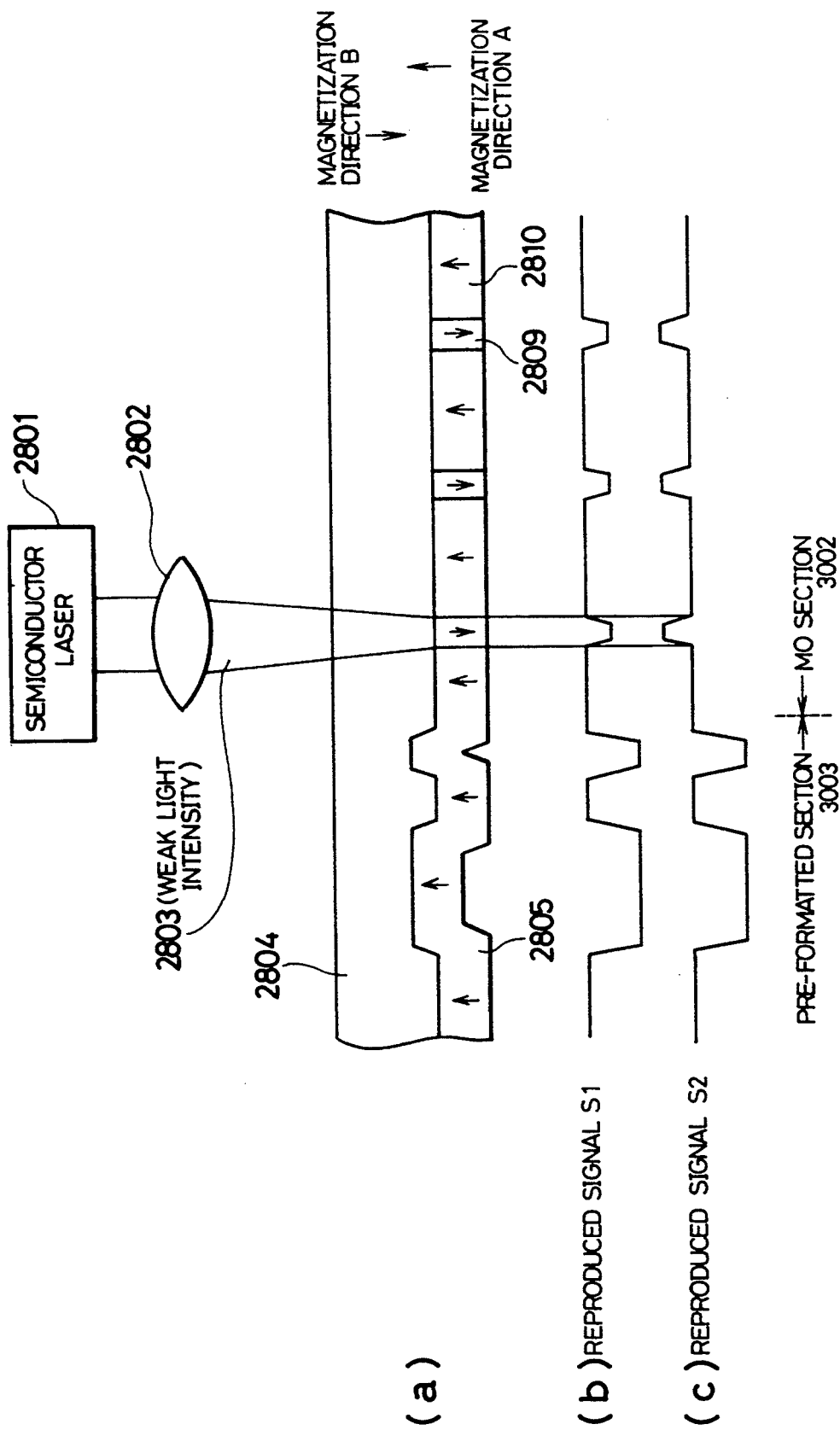

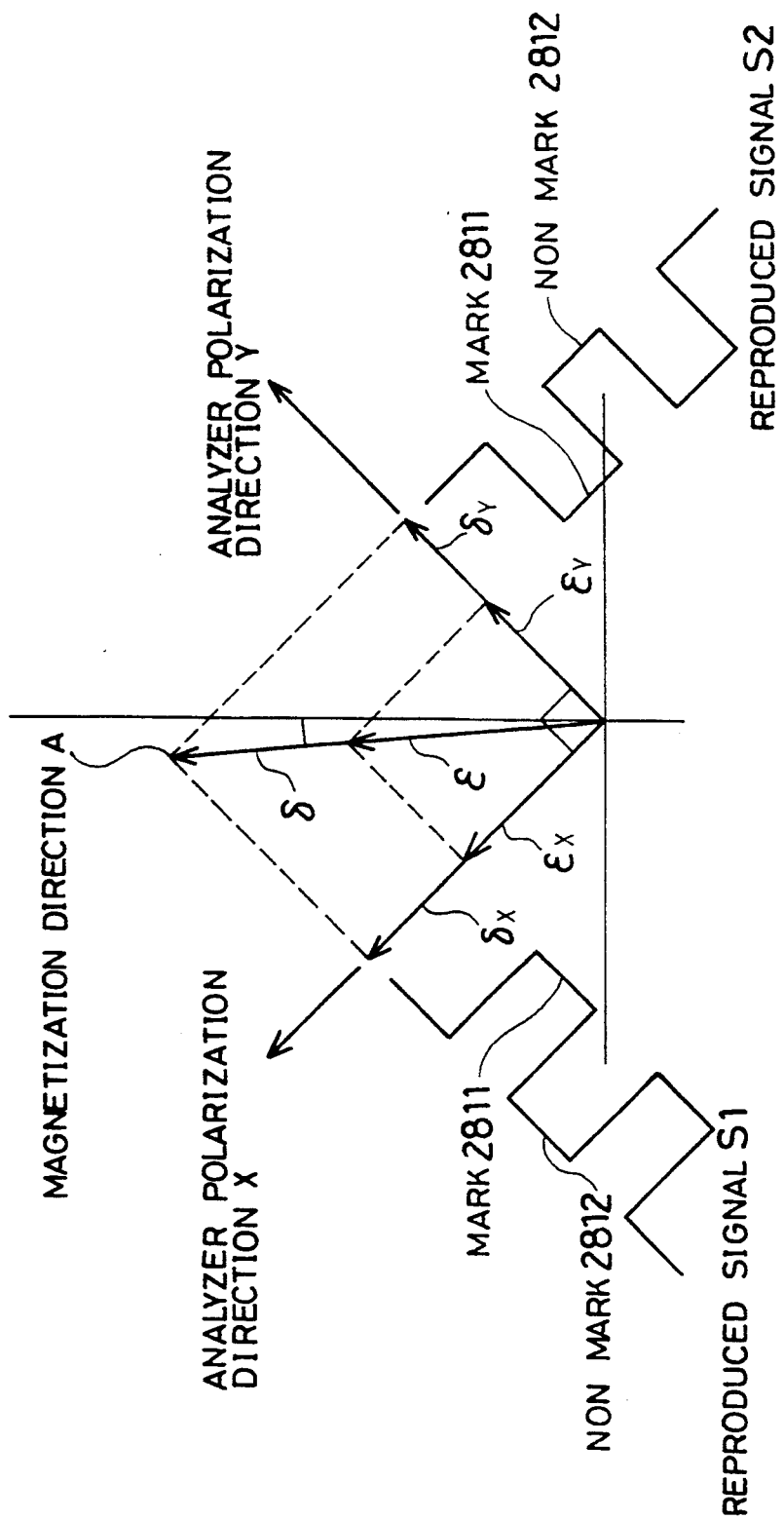

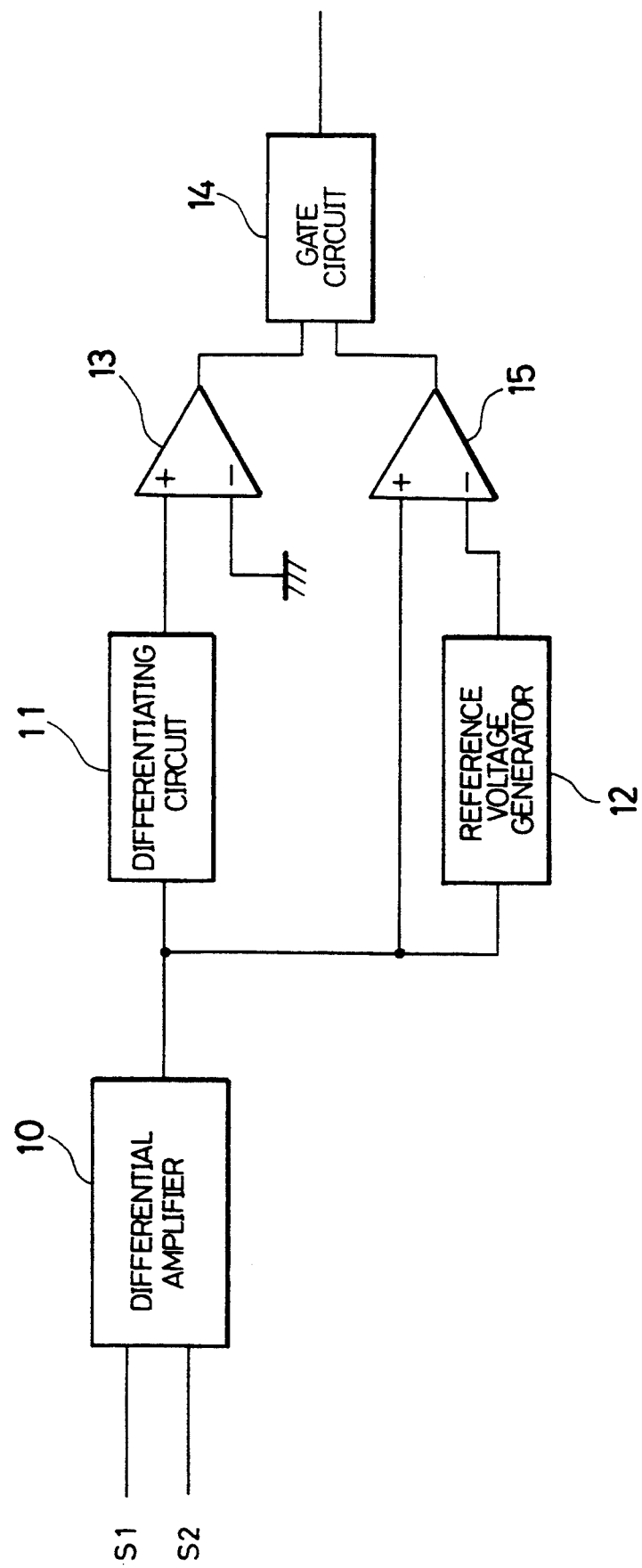

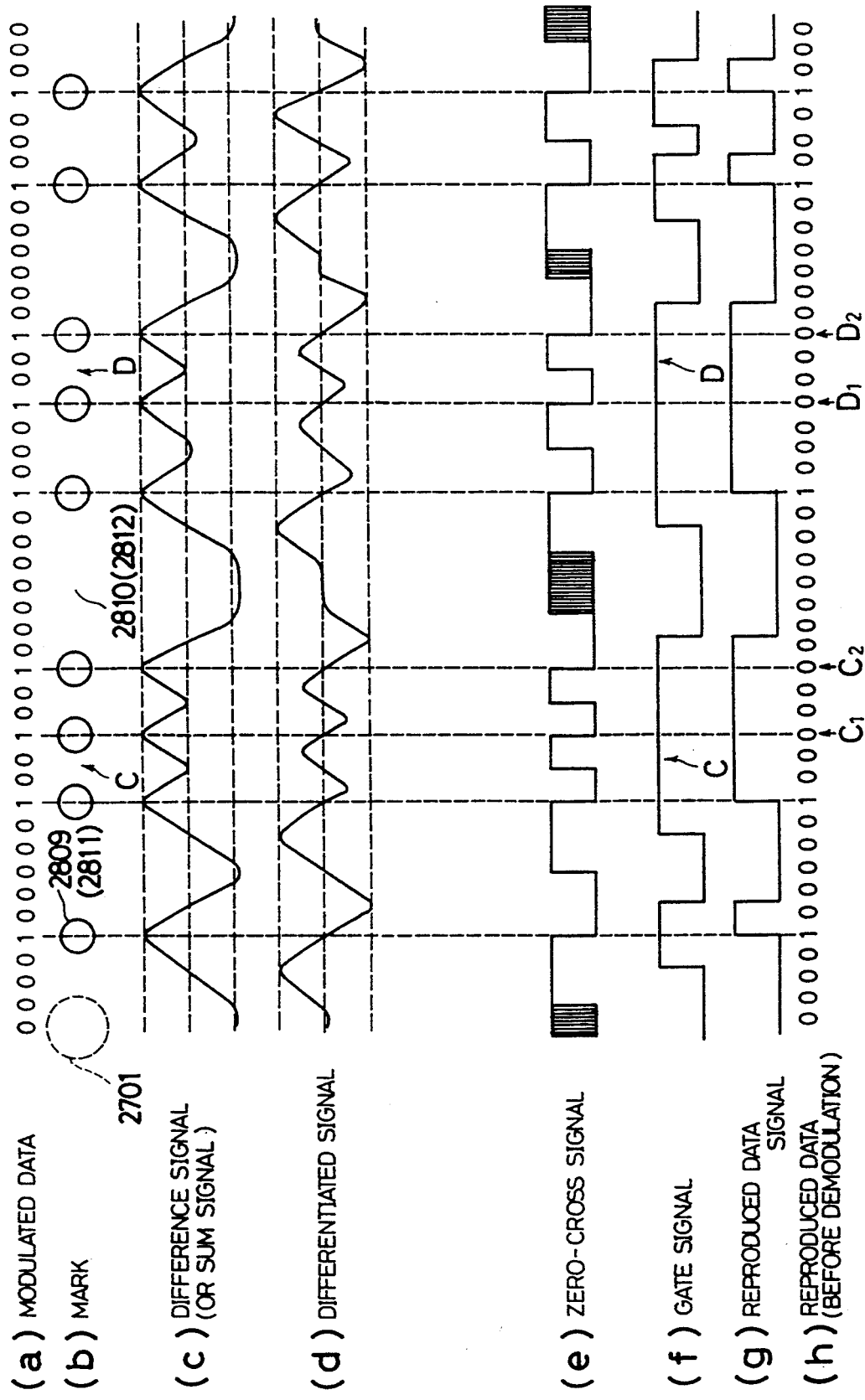

INFORMATION REPRODUCING DEVICE

This application is a continuation of application Ser. No. 07/580,946 filed on Sep. 11, 1992, now abandoned.

FIELD OF THE INVENTION

The present invention relates to an information reproducing device for reproducing information recorded on an optical memory.

BACKGROUND OF THE INVENTION

Recently, magneto-optical disks where information can be recorded, reproduced and erased have been developed as substitutes for the Read-Only type optical disks such as compact disks. As an example of information reproducing device, description will be made hereinbelow of a magneto-optical disk device capable of recording, reproducing and erasing information on a magneto-optical disk.

As illustrated in FIG. 28(a), a typical magneto-optical disk is constituted of disk substrate 2804 and a recording magnetic film 2805 formed on the disk substrate 2804. The recording magnetic film 2805 is formed such that its axis of easy magnetization is perpendicular to the film surface thereof, and is initialized such that the direction of magnetization indicated by an arrow A or an arrow B within the film shown in FIG. 28(a) is preliminary set in a fixed direction (for example, shown by the arrow A in FIG. 28(a)).

During recording, a laser beam 2803 is projected from a semiconductor laser 2801, converged by an objective lens 2802 so as to have a diameter of approximately 1 μm and is irradiated on the recording magnetic film 2805. At this time, the intensity of the laser beam 2803 is controlled according to a recording signal 2807 (see FIG. 28(b)) corresponding to the information to be recorded. When the recording signal 2807 is in the high level and thereby the intensity of the laser beam 2803 is strong, the temperature of the area illuminated by the strong laser beam 2803 rises locally, goes above the Curie point, and the coercive force of the area illuminated significantly lowers. An external magnetic field 2806 is applied at the same time that the laser beam 2803 is irradiated. As a result, the direction of magnetization A in the area where the coercive force lowered is inverted and frozen in the same direction of magnetization B as the external magnetic field 2806 thereby permitting information corresponding to the recording signal 2807 to be recorded on the recording magnetic film 2805. Hereinafter, parts where high level recording signals 2807 were recorded as described above and where the direction of magnetization is B will be referred to as marks 2809, and parts where low level recording signals 2807 were recorded and where the direction of magnetization is A will be referred as non-marks 2810.

Information recorded on the recording magnetic film 2805 is erased by inverting the direction of the external magnetic field 2806 and following a method similar to the one used for recording. The direction of magnetization is restored to its original direction of initialization, i.e. the direction of magnetization A in FIG. 28(a), and the recorded information is erased. Marks 2809 thus become non-existent in the erased part.

In the present example, the light modulation method is adopted, i.e. recording is executed by modulating the intensity of the laser beam 2803 in accordance with the recording signal 2807, and applying an external magnetic field 2806 of a constant intensity. However, the magnetic modulation method may as well be adopted and recording can be executed by making the intensity of the laser beam 2803 constant and modulating the direction of the external magnetic field 2806 in accordance with the recording signal 2807.

The disk substrate 2804 mentioned earlier is made of glass, plastic or other material, and lands and pits 2808 are preliminary etched thereon, as shown in FIG. 28(a). The lands and pits 2808 represent address information indicating the addresses of tracks and sectors. The above address information is preliminary etched onto the disk substrate 2804 during the manufacturing stage of the magneto-optical disk according to a fixed format. Hence, the lands and pits 2808 cannot be recorded or erased thereafter. Hereinafter, parts where a plurality of lands and pits 2808 are formed in a group will be referred to as pre-formatted sections 3003. Information is recorded and erased in areas other than the pre-formatted sections 3003. These areas will be referred to hereinafter as MO (magneto-optical) sections 3002. Pre-formatted sections 3003 and MO sections 3002 are usually accommodated alternately to form a track 3005 in a spiral shape or in the shape of concentric circles, as illustrated in FIG. 30. A sector 3004 is constituted by a pair composed of a pre-formatted section 3003 and MO section 3002.

As illustrated in FIG. 30, a magneto-optical disk 3001 comprises a plurality of sectors 3004 formed on the track 3005, each sector 3004 being provided with address information. Information is recorded, reproduced and erased sector 3004 by sector 3004.

As illustrated in FIG. 31, the pre-formatted sections 3003 of the tracks 3005 are arranged such that either the land or the pit that compose one land and pit 2808 shown in FIG. 28(a) form a mark 2811, and such that the other component of the land and pit 2808 form a non-mark 2812. Marks 2809 and non-marks 2810 are recorded in the MO section 3002 in response to MO signals as described earlier.

When reproduction is performed on the magneto-optical disk 3001, the laser beam 2803 is projected from the semiconductor laser 2801, is converged by the objective lens 2802 so as to have a diameter of 1 μm and is irradiated upon the recording magnetic film 2805, as illustrated in FIG. 29(a). Here, the intensity of the laser beam 2803 is weaker when information is reproduced than when information is recorded or erased. The laser beam 2803 is a linearly polarized light and its plane of polarization is rotated as the laser beam 2803 passes through or is reflected by the recording magnetic film 2805 due to the Faraday effect or the Kerr effect. The plane of polarization of the laser beam 2803 is rotated in mutually opposite directions depending on whether the laser beam 2803 is irradiated on a mark 2809 or a non-mark 2810. Reproduction of recorded information is performed by detecting the difference in polarization direction. Accordingly, two types of reproduced signals S1 and S2, shown by (b) and (c) in FIG. 29, are generated.

The reproduction optical system employed for producing the reproduced signals S1 and S2 will be discussed briefly hereinbelow. As illustrated in FIG. 32, a reflected light 3201 coming from the magneto-optical disk 3001 is directed toward a PBS (analyzer) 3202 where it is split according to its polarization direction through the Kerr effect. Two detected lights 3210 and 3211 that were separated in the PBS 3202 are respectively directed toward photodetectors 3203 and 3204 where they are converted into electric signals that vary according to the respective intensities of the detected lights 3210 and 3211, and released as reproduced signals S1 and S2. As it will be covered in details later, the signals from the pre-formatted section 3003 and the MO section 3002 are obtained separately by determining the sum and the difference of the reproduced signals S1 and S2. In addition, the marks 2809 and the non-marks 2810 may be reproduced separately through the signals of the MO section 3002 thereby enabling the information recorded on the recording magnetic film 2805 to be reproduced.

Suppose that $\alpha$ represents the vector of a reflected light from a non-mark 2810 (direction of magnetization A) of the MO section 3002, and $\beta$ represents the vector of a reflected light from a mark 2809 (direction of magnetization B) of the MO section 3002. The reflected light vectors $\alpha$ and $\beta$ are rotated in opposite directions by an angle corresponding to the rotation angle of their respective plane of polarization, as illustrated in FIG. 33. The X direction components and Y direction components of the reflected light vectors $\alpha$ and $\beta$ are detected in the PBS 3202 that transmits light having a X or Y polarization direction. These two polarization directions X and Y form a right angle.

Geometrical explanation will be made hereinbelow. The reflected light vector $\alpha$ is projected in the polarization direction X and the polarization direction Y thereby producing detected light vectors $\alpha_X$ and $\beta_Y$. Similarly, the reflected light vector $\beta$ is projected in the polarization direction X and the polarization direction Y thereby producing detected light vectors $\beta_X$ and $\beta_Y$. The magnitudes of detected light vectors $\alpha_X$ and $\beta_X$ correspond to the reproduced signal S1 and the magnitudes of the detected light vectors $\alpha_Y$ and $\beta_Y$ corresponds to the reproduced signal S2. Further, the detected light vectors $\alpha_X$ and $\beta_X$ correspond to the detected light 3210 shown in FIG. 32, and the detected light vectors $\alpha_Y$ and $\beta_Y$ correspond to the detected light 3211.

Assume, as illustrated in FIG. 33, the high level of the reproduced signal S1 corresponds to a non-mark 2810 and the low level of the reproduced signal S1 corresponds to a mark 2809. Here, the high level of the reproduced signal S2 corresponds to a mark 2809 and its low level to a non-mark 2810. The polarity of the reproduced signal S1 and the polarity of the reproduced signal S2 are thus opposite. The reproduced signals S1 and S2 are then fed into a differential amplifier where the difference of the reproduced signals S1 and S2 is determined and the reproduced signals S1 and S2 are amplified and thereby their S/N is improved, and information is reproduced.

The reproduced signals S1 and S2 obtained from the pre-formatted sections 3003 will be described hereinbelow with reference to FIG. 34. As there is no recording nor erasing operation taking place in the pre-formatted sections 3003, the direction of magnetization therein coincides with the direction A only. When the laser beam 2803 is irradiated on a pre-formatted section 3003, the shape of the marks 2811 and non-marks 2812, i.e. the lands and pits 2808, causes the laser beam 2803 to be diffracted. As a result, a long reflected light vector $\delta$ or a short reflected light vector $\epsilon$ is produced according to the land or pit 2808, as illustrated in FIG. 34. Namely, a long reflected light vector $\delta$ is produced when for example a non-mark 2812 is reproduced, and a short reflected light vector $\epsilon$ is produced when a mark 2811 is reproduced.

A detected light vector $\delta_X$ and a detected light vector $\delta_Y$ are produced by projecting the reflected light vector $\delta$ in the polarization direction X and in the polarization direction Y of the PBS 3202. Similarly, a detected light vector $\epsilon_X$ and a detected light vector $\epsilon_Y$ are produced by projecting the reflected light vector $\epsilon$ in the polarization direction X and in the polarization direction Y of the PBS 3202. The magnitudes of the detected light vector $\delta_X$ and of the detected light vector $\epsilon_X$ correspond to the reproduced signal S1, and the magnitudes of the detected light vector $\delta_Y$ and of the detected light vector $\epsilon_Y$ correspond to the reproduced signal S2. The high level of the reproduced signal S1 and and the high level of the reproduced signal S2 both correspond to a non-mark 2812 of the lands and pits 2808, the low level of the reproduced signal S1 and the low level of reproduced signal S2 correspond to marks 2811. Consequently, as illustrated in FIGS. 29(b) and (c), the reproduced signals S1 and S2 have the same polarity for the pre-formatted section 3003 while they have mutually inverted polarities for the MO section 3002.

As a result, when for example determining the difference between the reproduced signal S1 and the reproduced signal S2 in a differential amplifier 10 shown in FIG. 35, an analog signal will be obtained only for information of the MO section 3002. Meanwhile, when determining the sum of the reproduced signals S1 and S2 in a summing amplifier not shown, an analog signal is obtained only for information of the pre-formatted section 3003. In such a fashion the S/N may be improved.

A binary conversion circuit adapted for information from the MO section 3002, will be described hereinbelow as an example of circuit for converting the analog signals obtained as mentioned above into binary signals. As illustrated in FIG. 35, the analog signal that was released by the differential amplifier 10, (i.e. that was reproduced from the MO section 3002), is fed into a differentiating circuit 11, the non-inverting input terminal of a comparator 15 and a reference voltage generator 12. The analog signal is differentiated in the differentiating circuit 11 and the resulting differentiated signal is compared with a ground potential in a comparator 13. The comparator 13 subsequently releases a zero-cross signal, i.e. a signal that goes in the high level and in the low level when the differentiated signal crosses its zero level, that is fed into a gate circuit 14.

Meanwhile, the reference voltage generator 12 generates a reference voltage in accordance with the analog signal supplied from the differential amplifier 10, and sends this reference voltage into the inverting input terminal of a comparator 15. In the comparator 15, the analog signal supplied from the differential amplifier 10 is compared with the above reference voltage and is converted into a binary signal, and a gate signal is generated. The gate signal is fed into the gate circuit 14. A reproduced data signal is generated in the gate circuit 14 based on the zero-cross signal and the gate signal, as it will be discussed later. Analog signals reproduced from pre-formatted sections 3003, are converted into binary signals in a circuit having a configuration similar to the one illustrated in FIG. 35 except that the differential amplifier 10 is replaced by a summing amplifier.

Waveforms of signals generated in the different sections of the binary conversion circuit shown in FIG. 35 will be described hereinbelow with reference to FIG. 36. Here, it is assumed that modulated data as shown by (a) in FIG. 36 was modulated and generated through for example a 2-7 modulation method (to be covered in detail below). In this case, the mark 2809 of the MO section 3002 (or mark 2811 of the land and pit 2808) is recorded such that the center thereof coincides with the binary code "1" of the modulated data, as illustrated by (b) in FIG. 36. A mark 2809 is reproduced by means of a laser spot 2701, and the analog signal reproduced from the MO section 3002 as shown by (c) in FIG. 36, is obtained by determining the difference between the reproduced signals S1 and S2. When the mark 2811 is reproduced, the analog signal reproduced from the pre-formatted section 3003 is obtained by determining the sum of the reproduced signals S1 and S2. The analog signal obtained as described above, is differentiated in the differentiating circuit 11 and the differentiated signal as shown by (d) in FIG. 36 is obtained. The differentiated signal is fed into the comparator 13 that releases the zero-cross signal signal as shown by (e) in FIG. 36.

The analog signal shown by (c) in FIG. 36 is converted into the binary signal in the comparator 15 and the gate signal as shown by (f) in FIG. 36 is generated. The gate signal is then fed into the gate circuit 14. The gate circuit 14 releases a high level ("1") signal when the zero-cross signal falls while the gate signal is in the high level and releases a low level ("0") signal simultaneously with the change of the gate signal to the low level. As a result, the reproduced data signal as shown by (g) in FIG. 36 is released from the gate circuit 14. Based on the reproduced data signal, reproduced data which binary code corresponds to "1" only when the reproduced data signal rises, can be obtained.

However, in sections such as sections C and D shown in FIG. 36(b) where the interval between adjacent marks 2809 (or 2811) is narrow, in other words in parts where the frequency of the analog signal shown by (c) in FIG. 36 is relatively high, the peak-to-peak value of the analog signal is small. Therefore, when the analog signal is converted into a binary signal in the binary conversion circuit such as shown ill FIG. 35, the gate signal might stay in the high level in sections where it should drop to the low level, such as for example sections C and D of (f) in FIG. 36.

When, as described above, the gate signal does not drop to the low level in sections where it is supposed to, the reproduced data signal (shown by (g) in FIG. 36) consequently does not drop to the low level in sections where it should do so. Consequently, as shown by $C_1$, $C_2$, $D_1$ and $D_2$ in FIG. 36(h), the binary code of the reproduced data coincides with "0"where it should be "1" in order to correspond to the modulated data shown by (a) in FIG. 36. A conventional magneto-optical disk device thus presents a drawback that reproduction errors occur.

In addition, when variations occurred in the upper limit level and lower limit level of the analog signal shown by (c) in FIG. 36 due to irregularities in the reflectance on the magneto-optical disk 3001, with a conventional magneto-optical disk device, the gate signal shown by (f) in FIG. 36 becomes even more unreliable causing the occurrence of reproduction errors to increase.

SUMMARY OF THE INVENTION

An object of the present invention is to provide an information reproducing device where a binary gate signal is generated accurately in accordance with the variations of an analog signal reproduced as a light beam is irradiated on an information recording medium, thereby enabling data recorded on the information recording medium to be reproduced accurately.

In order to achieve the above-mentioned object, an information reproducing device in accordance with the present invention comprises:

zero-cross signal generating means for differentiating a reproduced analog signal and generating a differentiated signal, comparing the differentiated signal with its zero level and thereby generating a binary zero-cross signal, gate signal generating means for generating a binary gate signal in accordance with the variations of the reproduced analog signal, binary reproduced signal generating means for generating a binary reproduced signal derived from the comparison of the zero-cross signal and the gate signal, and equalizing means for emphasizing the high-frequency components of the reproduced analog signals, wherein the equalizing means is installed ahead of at least the gate signal generating means.

With the above arrangement, an analog reproduced signal where the peak-to-peak value of the high-frequency components was emphasized, is supplied to at least the gate signal generating means. This arrangement permits the gate signal which is converted into a binary signal based on the variations of the analog reproduced signal, to be generated more accurately. As a result, the binary reproduced signal is generated more accurately by the binary reproduced signal generating means and thereby reproduction errors are reduced.

Further, in order to achieve the above object, another information reproducing device in accordance with the present invention comprises:

zero-cross signal generating means for differentiating a reproduced analog signal and generating a differentiated signal, comparing the differentiated signal with its zero level and thereby generating a binary zero-cross signals, gate signal generating means for generating a binary gate signal in accordance with the variation of the reproduced analog signal, binary reproduced signal generating means for generating a binary reproduced signal derived from the comparison of the zero-cross signal and the gate signal, and clamping means for adjusting and setting the upper limit level or lower limit level of the analog reproduced signal, wherein the clamping means is installed ahead of the gate signal generating means.

The clamping means is characterized in comprising:

a first transistor to which base a clamping control voltage is fed to, and such that the output of its emitter corresponds with the output of the clamping means, a second transistor to which base the analog reproduced signal is fed to, and a capacitor that is installed between and connected to the emitters of the first and second transistors.

With the above arrangement, the upper limit level or the lower limit level of the analog reproduced signal is adjusted in the clamping means, and a signal which upper limit level or lower limit level is set to the adjusted value is supplied to the gate signal generating means. This arrangement permits the gate signal which is converted into a binary signal based on the variation of the analog reproduced signal, to be generated more accurately. As a result, the binary reproduced signal is generated more accurately by the binary reproduced signal generating means and thereby reproduction errors are reduced.

In addition, the adjusted value of the upper limit level or the lower limit level value may be changed to a desired value by modifying the clamping control voltage in the clamping means.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 24 describe a first embodiment of the present invention.

FIGS. 1a through i is an explanatory view illustrating the waveforms of signals generated in the different sections of a MO waveform processing section.

FIG. 2 is a block diagram illustrating the configuration of the MO waveform processing section.

FIG. 3 is a circuit diagram illustrating a low-pass filter.

FIG. 4 is a circuit diagram illustrating an equalizer.

FIG. 5 is a circuit diagram illustrating a clamping circuit.

FIG. 6 (a) is an explanatory view illustrating two signals released by the clamping circuit.

FIG. 6(b) is a graph illustrating the relation between the frequency and the gain in a first equalizing section and inca second equalizing section.

FIG. 7 is a circuit diagram illustrating a gate generating circuit, a differentiating zero-cross detection circuit, and a gate circuit.

FIGS. 8a through d is an explanatory view illustrating the comparison between the peak-to-peak values of analog reproduced signals from the outer section and from the inner section of a magneto-optical disk.

FIG. 9 is an explanatory view illustrating schematically the overall configuration of a magneto-optical disk device.

FIG. 10 is a block diagram illustrating the configuration of a recording circuit.

FIG. 11 is a block diagram illustrating the configuration of a reproduction circuit.

FIG. 12 is a block diagram illustrating essential parts of a controller.

FIG. 13 is a block diagram illustrating the configuration of a semiconductor laser driving circuit.

FIGS. 14a through d is an explanatory view illustrating the change-over of a high-frequency superposition switch signal and other signals in accordance with a sector format, during recording.

FIGS. 15a through d is an explanatory view illustrating the level of the high-frequency superposition switch signal and other signals in accordance with the sector format, during reproduction.

FIG. 16 is a block diagram illustrating the configuration of a timing generating circuit.

FIG. 17 is a block diagram illustrating the configuration of a sector mark detection circuit.

FIGS. 18a through e is an explanatory view illustrating the detection process of a sector mark.

FIGS. 19a through h is an explanatory view illustrating the waveforms of signals generated in different sections of the timing generating circuit.

FIG. 20 is a block diagram illustrating the configuration of a signal processing circuit.

FIG. 21a through g is an explanatory view illustrating the waveforms of signals generated in the different sections of the signal processing circuit.

FIG. 22 is a circuit diagram illustrating a modified example of a clamping circuit.

FIG. 23 is a circuit diagram illustrating another modified example of the clamping circuit.

FIG. 24 is a circuit diagram illustrating a modified example of an equalizer.

FIGS. 25 to 27 illustrate a second embodiment of the present invention.

FIG. 25 is a block diagram illustrating the configuration of a MO waveform processing section.

FIG. 26 is a circuit diagram illustrating an equalizer.

FIG. 27a through i is an explanatory view illustrating waveforms of signals generated in the different sections of the MO waveform processing section.

FIGS. 28 to 36 illustrate a conventional device.

FIG. 28a & b is an explanatory view illustrating a recording operation executed by a magneto-optical disk device on a magneto-optical disk.

FIG. 29a, b and c is an explanatory view illustrating a reproducing operation executed by the magneto-optical disk device on the magneto-optical disk.

FIG. 30 is a schematic explanatory view illustrating the configuration of a sector formed on the magneto-optical disk.

FIG. 31 is an enlarged view of essential parts shown in FIG. 30.

FIG. 32 is an explanatory view illustrating the configuration of essential parts of a reproduction optical system.

FIG. 33 is an explanatory view illustrating the relation between the polarities of two signals reproduced from a MO section of the magneto-optical disk.

FIG. 34 is an explanatory view illustrating the relation between the polarities of two signals reproduced from a pre-formatted section of the magneto-optical disk.

FIG. 35 is a block diagram illustrating a circuit where reproduced signals are converted into binary signals.

FIG. 36a through h is an explanatory view illustrating waveforms of signals generated in the different sections of the circuit shown in FIG. 35.

DESCRIPTION OF THE EMBODIMENTS

1. First embodiment

Figure 1:
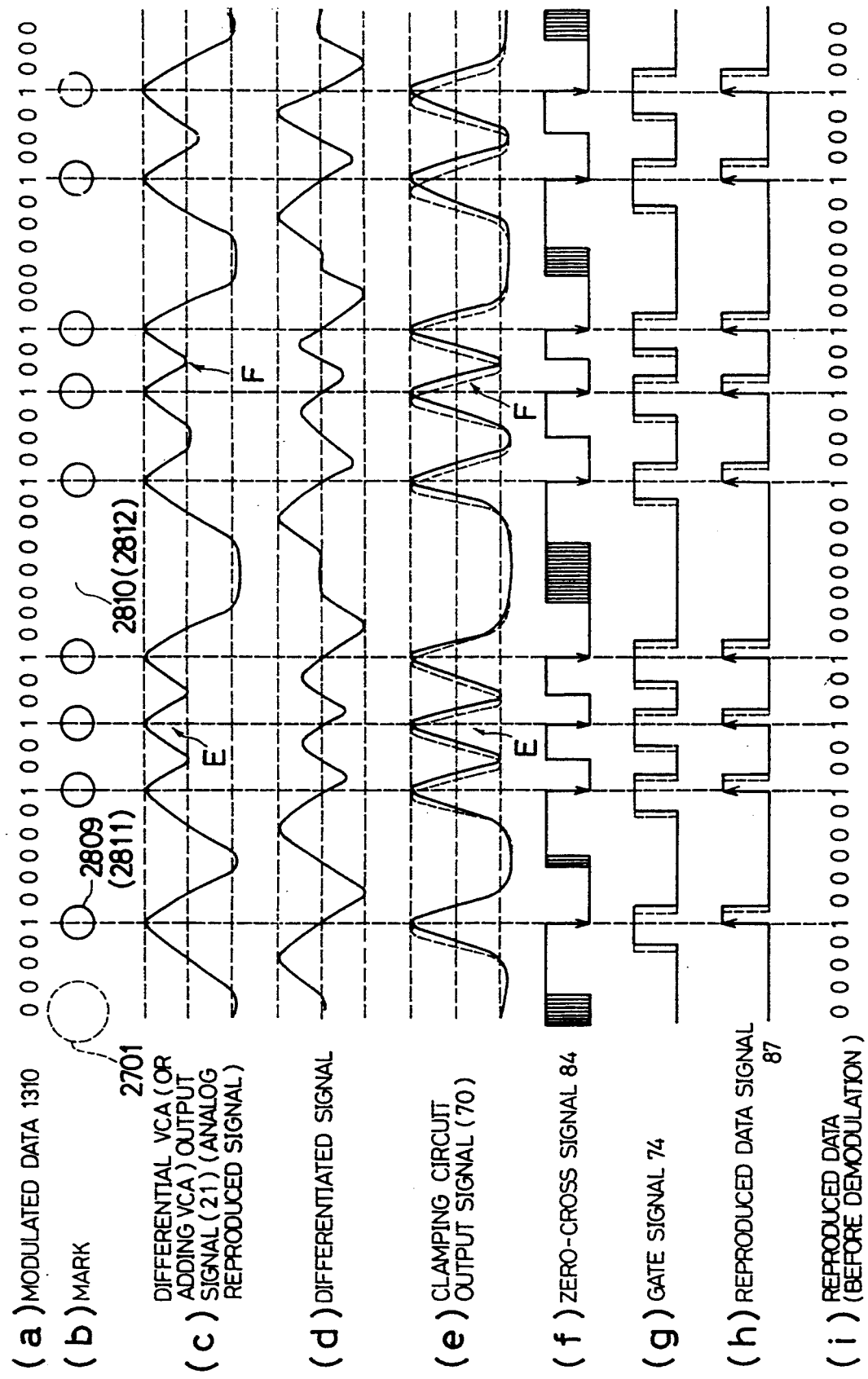

A first embodiment of the present invention will be described hereinbelow with reference to FIGS. 1 to 24.

In the above noted figures, a magneto-optical disk device capable of recording, erasing and reproducing on a magneto-optical disk will be discussed, as an example of information reproducing device.

1.1 Outline of the configuration and operation

First, essential parts of the magneto-optical disk device will be described with reference to FIG. 9.

Information is recorded/reproduced/erased on/from a magneto-optical disk 1201 used as recording medium as follows. A laser beam 1204 is projected from an optical head 1203 and irradiated on the magneto-optical disk 1201 while the magneto-optical disk 1201 is driven to rotate by a spindle motor 1202. In addition, when information is to be recorded or erased, an external magnetic field is applied from an external magnetic field applying magnet 1205 simultaneously with the projection of the laser beam 1204 on the magneto-optical disk 1201. If the external magnetic field applying magnet 1205 is constituted by a permanent magnet, when recording and erasing information, the orientation of the magnetic field can be inverted by having a motor, not shown, rotate the external magnetic field applying magnet 1205. Besides, when the external magnetic field applying magnet 1205 is composed of an electromagnet, and the orientation of the external magnetic field may be inverted by making provision such that the electric current is supplied to the external magnetic field applying magnet 1205 in inverted directions when information is recorded and when information is erased.

During recording, a semiconductor laser driving current 1210 is supplied from a recording circuit 1206 to a semiconductor laser 2801 (see FIG. 10) housed within the optical head 1203. The light intensity of the semiconductor laser 2801 is suitably controlled through the semiconductor laser driving current 1210.

During reproduction, a reproduced signal 1211 is released from the optical head 1203 and fed into a reproduction circuit 1207. As was described earlier with reference to (b) and (c) of FIG. 29, the reproduced signal 1211 is composed of two types of reproduced signals S1 and S2. Reproduced data 1212 that was reproduced in the reproduction circuit 1207 is sent to a controller 1208.

Based on the reproduced data 1212, the timing control of various control signals 1213 is executed in the controller 1208. The control signals 1213 are then fed into the recording circuit 1206 and the reproduction circuit 1207. In addition, a magnetic field control signal 1214 is transmitted from the controller 1208 to the external magnetic field applying magnet 1205 thereby enabling the orientation of the external magnetic field to be controlled.

1.1.1 Sector format

The configuration of a sector 3004 that forms the unit per which information is recorded/reproduced on the magneto-optical disk 1201, will be described with reference to FIG. 14(a). A sector 3004 is composed of a pre-formatted section 3003 and a MO section 3002. Further, a pre-formatted section 3003 is formed by a sector mark section 1701 indicating the head end of each sector 3004 and where a sector mark needed for generating a synchronizing signal based on each sector 3004 is recorded, and an ID section 1702 comprising address information of the sector 3004. As it was described earlier with reference to FIG. 28(a), lands and pits 2808 are etched in the sections 1701 and 1702. A land and pit 2808 is composed of a mark 2811 and a non-mark 2812, and cannot be overwritten and/or erased. The MO section 3002 that represents the data section, is composed of a data section 1703 as data area where information is recorded/reproduced/erased, and a pair of gap sections 1704 and 1705 positioned in front of and behind the data section 1703. As it was described earlier with reference to FIG. 28(a), marks 2809 and non-marks 2810 corresponding to modulated data 1310, are recorded in the data section 1703. The gap sections 1704 and 1705, are margin areas provided between the pre-formatted sections 3003 and the MO sections 3002, and are used during the recording of information in the data section 1703. Namely, a phase error or other error may occur between the signal for detecting the rotation of the spindle motor 1202 and the synchronizing signal detected per sector 3004, causing the recording start position and the recording end position oil the magneto-optical disk 1201 to be shifted forward or backward. The gap sections 1704 and 1705 are meant for providing room for such a shift in position.

1.1.2 Recording circuit

Figure 9:
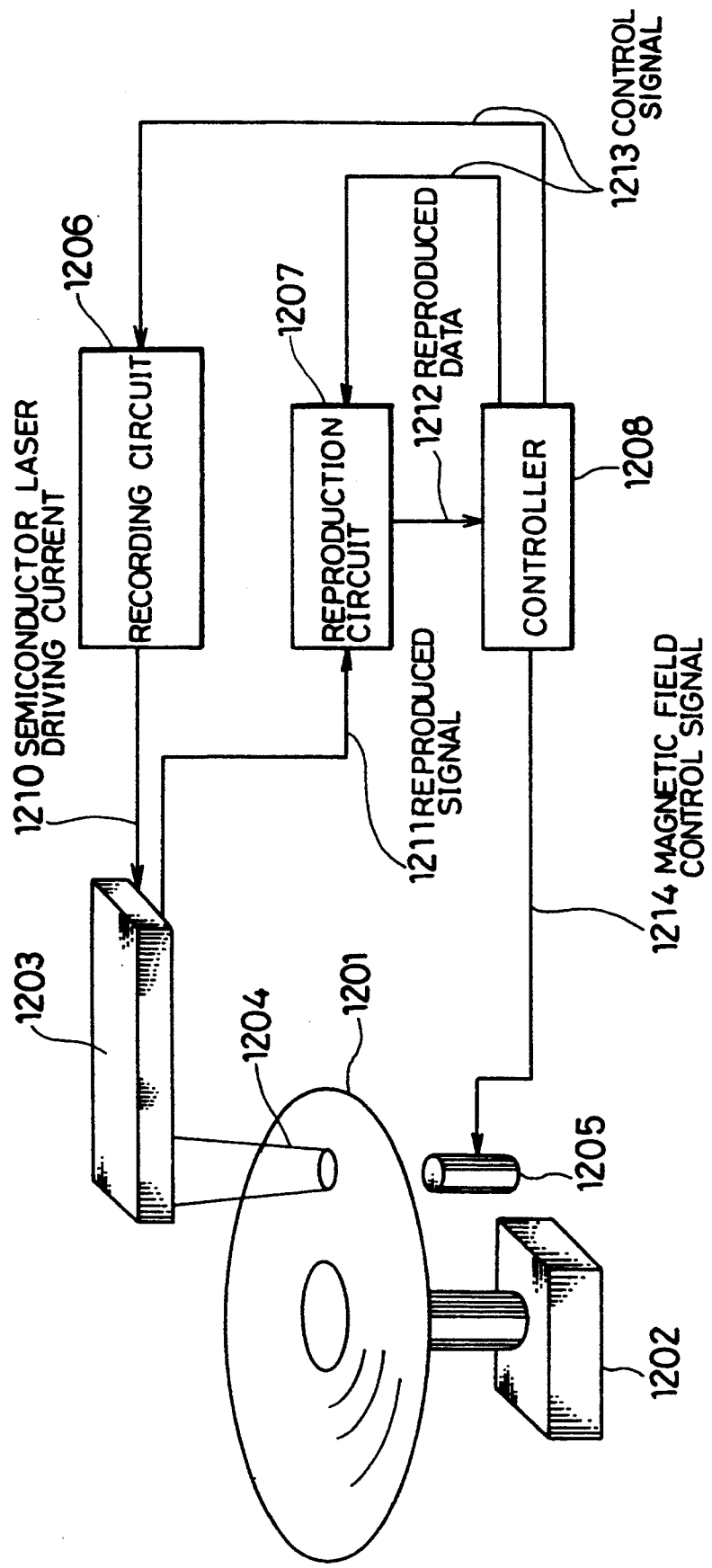
Figure 10:
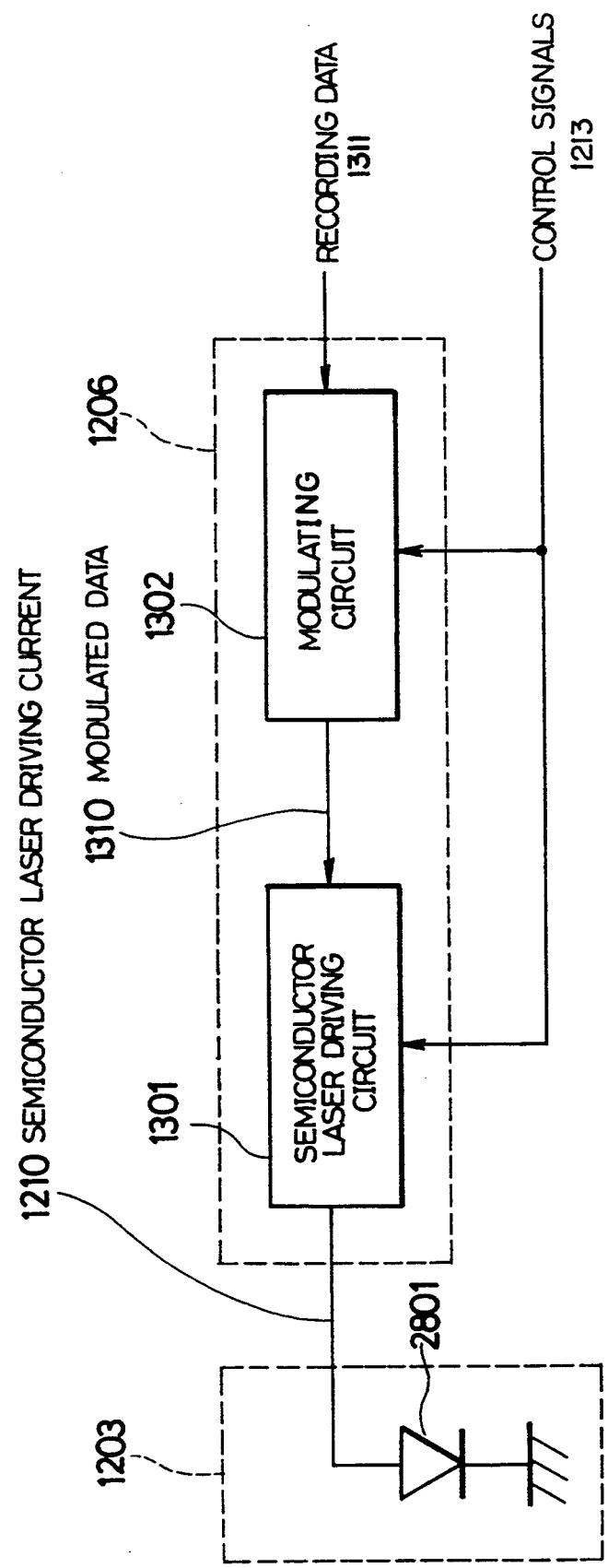

The configuration of the recording circuit 1206 shown in FIG. 9, is illustrated in FIG. 10. The recording circuit 1206 comprises a modulating circuit 1302 and a semiconductor laser driving circuit 1301. Recording data 1311 is sent from the controller 1208 shown in FIG. 9 into the modulating circuit 1302 where it is converted in accordance with the control signals 1213 and according to a predetermined format, into modulated data 1310. The modulation method adopted here may be for instance the 2–7 modulation method to be described later. The semiconductor laser driving circuit 1301 generates the semiconductor laser driving current 1210 in accordance with the modulated data 1310 that was supplied thereto from the modulating circuit 1302. The semiconductor laser driving current 1210 is sent from the semiconductor laser driving circuit 1301 to the semiconductor laser 2801. At the same time, the controller 1208 supplies the control signal 1213 to the semiconductor driving circuit 1301 thereby enabling the intensity of the semiconductor laser 2801 to be controlled suitably depending on the recording, reproducing or erasing operation performed.

Figure 14:
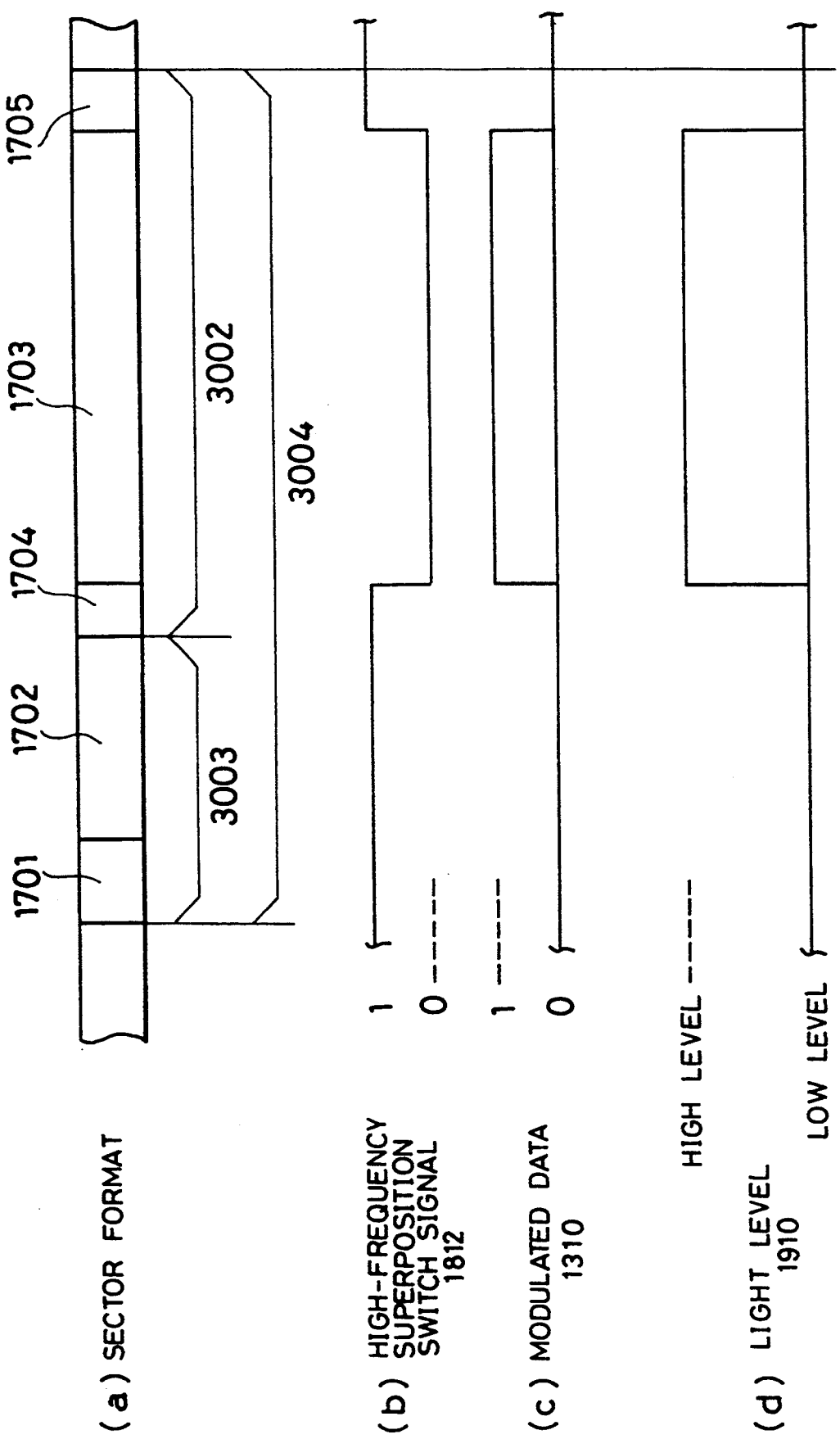

The modulation process performed in the modulating circuit 1302 is based upon the modulation method shown in Table 1 and called the 2–7 modulation method. The input data (recording information) shown in the left column of Table 1 is converted into predetermined modulated data shown in the right column. At this time, provision is made such that the number of consecutive "0" bits in the modulated data is comprised within 2 to 7. The modulated data 1310 that is conform to the sector format shown by (a) in FIG. 14, is then sent at a proper timing to the semiconductor laser driving circuit 1301 shown in FIG. 10.

TABLE 1

| Input data | Modulated data |
|---|---|
| 10 | 0100 |
| 010 | 100100 |
| 0010 | 00100100 |
| 11 | 1000 |
| 011 | 001000 |
| 0011 | 00001000 |
| 000 | 000100 |

1.1.3 Reproduction circuit

Figure 11:
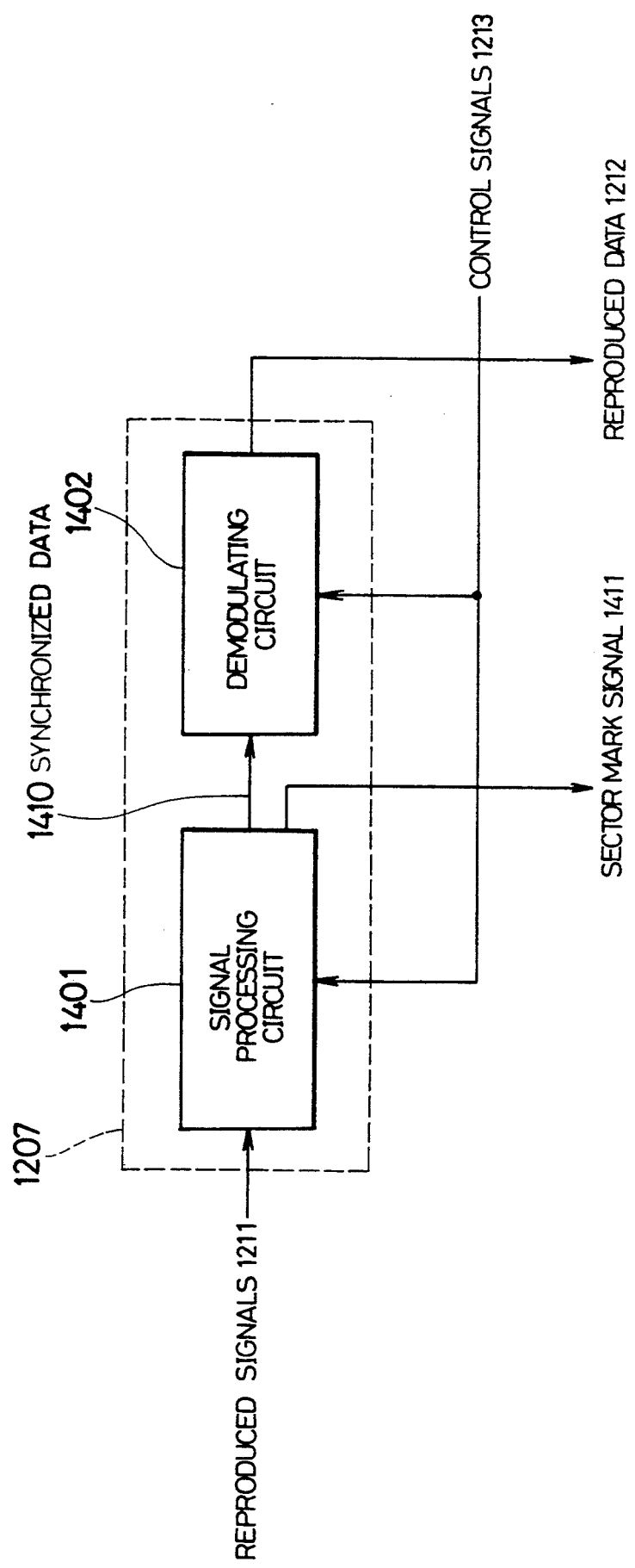

The configuration of the reproduction circuit 1207 shown in FIG. 9 is illustrated in FIG. 11. The reproduction circuit 1207 comprises a signal processing circuit 1401 and a demodulating circuit 1402. The reproduced signals 1211 (i.e. the reproduced signals S1 and S2) are fed from the optical head 1203 shown in FIG. 10, into the signal processing circuit 1401 where synchronized data is detected from the reproduced signals 1211. In addition, the signal processing circuit 1401 sends the detected synchronized data 1410 to the demodulating circuit 1402 and simultaneously, sends a sector mark signal 1411 to the controller 1208. The demodulation process of the synchronized data 1410 is performed in the demodulation circuit 1402 by following the modulating operation executed in the modulating circuit 1302 shown in FIG. 10 in reverse. The various control signals 1213 are fed from the controller 1208 into the signal processing circuit 1401 and tile demodulating circuit 1402. The demodulating circuit 1402 sends the demodulated reproduced data 1212 to the controller 1208.

1.1.4 Controller

The configuration of the controller 1208 shown in FIG. 9 will be described with reference to FIG. 12. The controller 1208 comprises a timing generating circuit 1501 and a control circuit 1502. The sector mark signal 1411 is sent from the signal processing circuit 1401 shown in FIG. 11 to the timing generating circuit 1501 that generates a reference timing signal 1510 synchronized with each sector 3004. The reference timing signal 1510 as well as the reproduced data 1212 from the demodulating circuit 1402 shown in FIG. 11 are fed into the control circuit 1502 that generates the various control signals 1213 based on these two input signals. The control circuit 1502 also executes the input/output of information from/to outer devices.

1.1.5 Semiconductor laser driving circuit

Figure 13:
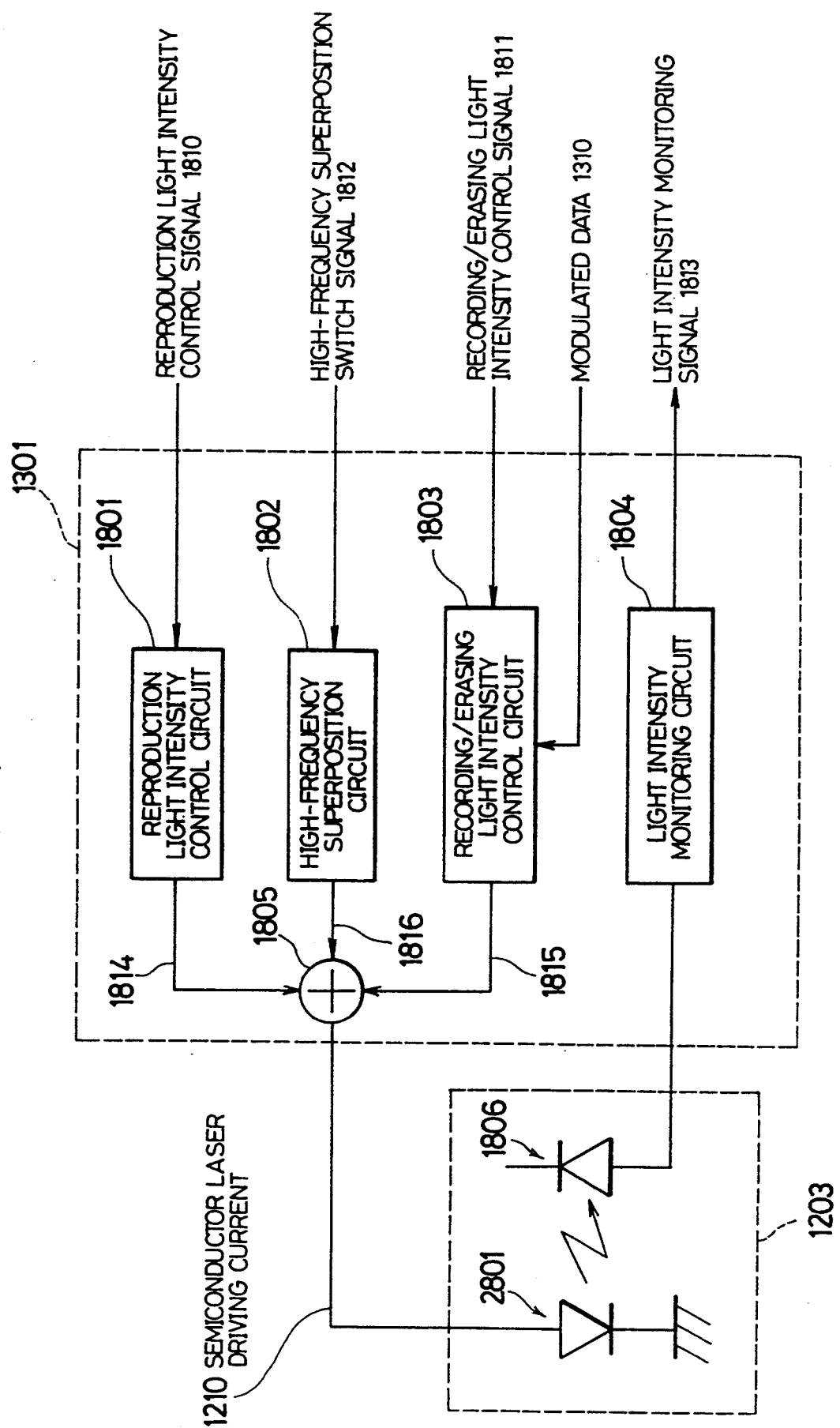

The configuration of tile semiconductor laser driving circuit 1301 shown in FIG. 10 will be described in details with reference to FIG. 13. The semiconductor laser driving circuit 1301 comprises a reproduction light intensity control circuit 1801, a high-frequency superposition circuit 1802, a recording/erasing light intensity control circuit 1803, a light intensity monitoring circuit 1804 and an adder 1805. A reproduction light intensity control signal 1810 is fed from the controller 1208 shown in FIG. 9 into the reproduction light intensity control circuit 1801 thereby permitting the intensity (quantity) of light emitted by the semiconductor laser 2801 housed within the optical head 1203 to be controlled appropriately during the reproduction. The modulated data 1310 from the modulating circuit 1302 shown in FIG. 10 and a recording/erasing light intensity control signal 1811 from the controller 1208 are fed into the recording/erasing light intensity control circuit 1803. Provision is made such that the recording/erasing light intensity control circuit 1803 controls the intensity of light emitted by the semiconductor laser 2801 during recording/erasing. The controller 1208 supplies a high-frequency superposition switch signal 1812 to the high-frequency superposition control circuit 1802. Based on the high-frequency superposition switch signal 1812, the high-frequency superposition control circuit 1802 releases an output signal 1816 that goes ON and OFF with a high frequency. The output signal 1816 released by the high-frequency superposition circuit 1802 and an output signal 1814 released by the reproduction light intensity control circuit 1801 are superposed in the adder 1805. Such an arrangement permits the reduction of the noise occurring in the semiconductor laser 2801 due to the return light reflected back from the magneto-optical disk 1201 to the semiconductor laser 2801. The output signal 1816 released by the high-frequency superposition circuit 1802 is sent to the adder 1805 exclusively during reproduction.

During reproduction, the sum of the output signal 1814 released by the reproduction light intensity control circuit 1801 and the output signal 1816 released by the high-frequency superposition circuit 1802 is performed in the adder 1805 and supplied as the semiconductor laser driving current 1210 to the semiconductor laser 2801. Meanwhile during recording, an output signal 1815 released by the recording/erasing light intensity control circuit 1803 is supplied as semiconductor laser driving current 1210 to the semiconductor laser 2801 via the adder 1805.

The light intensity of the semiconductor laser 2801 is converted into an electric signal by means of a photodetector 1806 housed within the optical head 1203. Based on the output released by the photodetector 1806 the light intensity monitoring circuit 1804 generates a light intensity monitoring signal 1813 that is sent to the controller 1208. The reproduction light intensity control signal 1810, the recording/erasing light intensity control signal 1811, and the high-frequency superposition switch signal 1812 are released by the controller 1208 based on the light intensity monitoring signal 1813. In other words, the light intensity of the semiconductor laser 2801 is controlled to an appropriate intensity for reproduction and for recording/erasing.

1.1.6 Recording/erasing/reproduction operations

Recording and erasing operations will be discussed hereinbelow.

As illustrated by (b) in FIG. 14, the high-frequency superposition switch signal 1812 goes to the low level ("0") when recording/erasing is executed in the data section 1703 (see (a) of FIG. 14). When recording/erasing is performed in sections other than the data section 1703, the high-frequency superposition switch signal 1812 stays in the high level ("1"). Namely, the high-frequency superposition switch circuit 1802 disables the high-frequency superposition when the data section 1703 is recorded/erased, and enables the high-frequency superposition when sections other than the data section 1703 are recorded/erased, in response to the high-frequency superposition switch signal 1812. During recording, the modulated data 1310, as shown by (c) in FIG. 14, is recorded as MO signal in the data section 1703. During erasing, the modulated data 1310 is erased from the data section 1703. At this time, the light level 1910 of the semiconductor laser 2801 is high when recording/erasing is performed in a data section 1703, and low when recording/erasing is performed in sections other than the data section 1703. Here, information is recorded/erased in the MO section 3002 while synchronized data is detected from the sector mark section 1701, the address information is read out from the ID section 1702 and the given address where recording/erasing is to be performed, is confirmed.

Meanwhile, when information recorded in the data section 1703 is reproduced, the high-frequency superposition switch signal 1812 is in the high level ("1") for both the pre-formatted section 3003 and the MO section 3002, as shown by (b) in FIG. 15. Besides, the modulated data 1310 is in the low level ("0"), as shown by (c) in FIG. 15, as there is no recording operation. Further, the light level 1910 as shown by (d) in FIG. 15, is lower than the light level 1910 shown by (d) in FIG. 14. In other words, pieces of information that were recorded as MO signals are reproduced from the MO sections 3002 while the synchronized data of the sectors 3004 is detected from the sector mark sections 1701 within the pre-formatted sections 3003, address information and other information are read out from the ID sections 1702 and the given addresses where reproduction is to be performed are confirmed, one after another.

1.2 Detailed configuration and operation

1.2.1 Timing generating circuit

The configuration of the timing generating circuit 1501 shown in FIG. 12 will be described in details with reference to FIG. 16, and the flow of signals released in different sections of the timing generating circuit 1501 will be described briefly. The generating process of the various signals will be covered later.

The timing generating circuit 1501 comprises a sector mark detection circuit 2101 where the sector mark signal 1411 released by the signal processing circuit 1401 shown in FIG. 11, is fed to. The sector mark detection circuit 2101 detects the presence/absence of the sector mark recorded in the sector mark section 1701 such as shown in FIG. 14(a), and releases a corresponding sector mark detection signal 2110. The sector mark detection signal 2110 is sent from the sector mark detection circuit 2101 to a counter 2102, a timer circuit 2104 and a judging circuit 2106. The sector mark detection signal 2110 is employed for the synchronization control required while recording, erasing or reproduction is performed sector 3004 by sector 3004. The timer circuit 2104 releases and sends an output signal 2113 to a window generating circuit 2105. The window generating circuit 2105 releases and sends an output signal 2114 to the Judging circuit 2106. The judging circuit 2106 generates a timing judge signal 2115 derived from the output signal 2114 and the sector mark detection signal 2110. The timing judge signal 2115 is sent to the control circuit 1502 shown in FIG. 12, and to a switch circuit 2103. The respective output signals 2111 and 2112 of the counter 2102 and timer circuit 2104 are sent to the switch circuit 2103. In the switch circuit 2103, one of the input signals 2111 and 2112 is selected in accordance with the timing Judge signal 2115, as will be described later, and sent as reference timing signal 1510 to the control circuit 1502 and a data section judging circuit 2107. The data section judging circuit 2107 releases and sends a data section Judge signal 2116 derived from the reference timing signal 1510, to the control circuit 1502.

The above-mentioned various control signals 1213 are generated by the control circuit 1502 based on the signals 1510, 2115 and 2116 released by the different circuits of the timing generating circuit 1501, and on the reproduced data 1212. The control signals 1213 are sent to the recording circuit 1206 and the reproduction circuit 1207 shown in FIG. 9 thereby permitting the different controls required for recording/reproducing/erasing information to be executed.

1.2.2 Sector mark detection circuit

Figure 17:
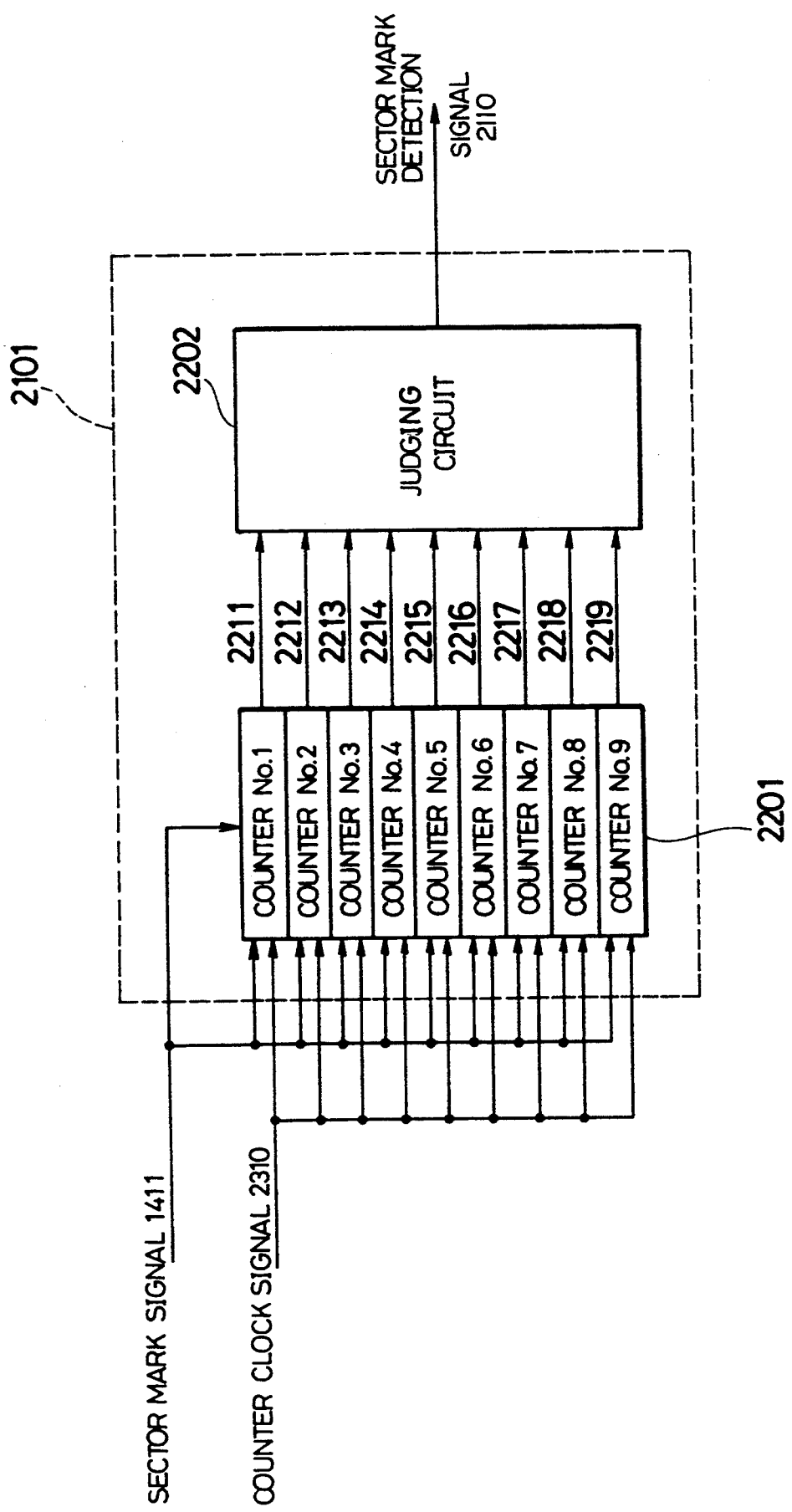

The configuration of the sector mark detection circuit 2101 will be described with reference to FIG. 17.

The sector mark detection circuit 2101 comprises a counter circuit 2201 composed of for example nine counters No. 1 to No. 9. The sector mark signal 1411 released by the signal processing circuit 1401 shown in FIG. 11, as well as a counter clock signal 2310 are fed into each of the counters No. 1 to No. 9. Detection signals 2211 to 2219 are released by the counters NO. 1 to No. 9 respectively, and are sent to a judging circuit 2202. The sector mark detection signal 2110 is then released in response to the judgement made in the judging circuit 2202 to be described later.

The operation of the counters No. 1 to No. 9 accommodated in the counter circuit 2201 will be described with reference to FIG. 18.

Figure 18:
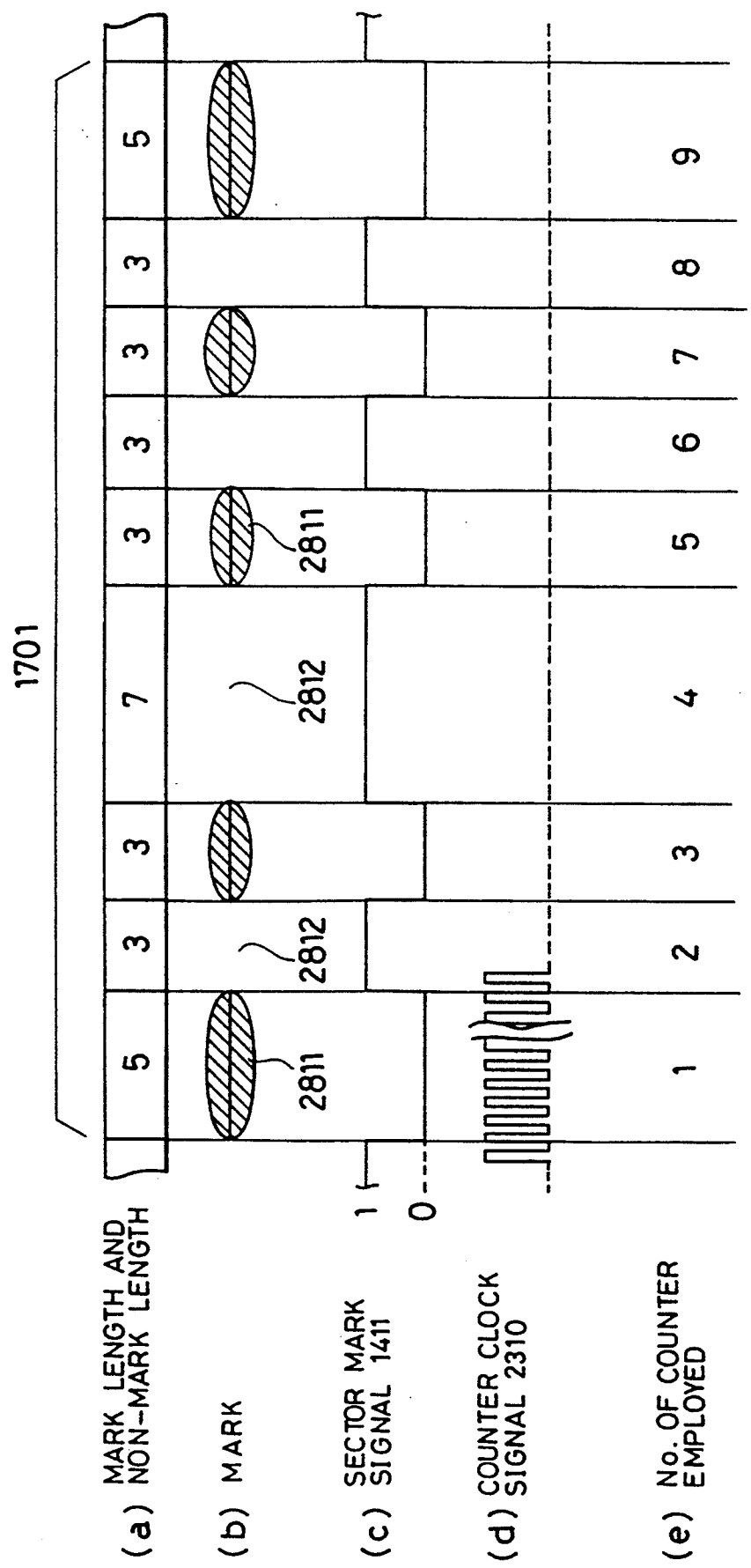

Here it is supposed that the synchronized data of the sector mark 1701 is recorded in a pattern composed of marks 2811 and non-marks 2812 such as shown by (b) in FIG. 18. In this example, a plurality of marks 2811 are etched such that the ratio of the lengths of marks to the lengths of non-marks is equal to 5:3:3:7:3:3:3:3:5 in this order, such as shown by (a) in FIG. 18. Provision is made such that this recording pattern is completely different from the recording pattern of the ID section 1702 and the recording pattern of the data section 1703 (2-7 modulation). The sector mark section 1701 can be thus detected separately from the the ID section 1702 and data section 1703. The sector mark signal 1411 mentioned above that is generated by the signal processing circuit 1401 shown in FIG. 11, can be obtained as marks 2811 and non-marks 2812 recorded in the above pattern are read out. The sector mark signal 1411 is a binary signal such as shown by (c) in FIG. 18, and is in the low level ("0") when for instance a mark 2811 is read, and in the high level ("1") when a non-mark 2812 is read.

When the sector mark signal 1411 is fed into each of the counters No. 1 to No. 9, first the counter No. 1 counts the number of clock pulses of the counter clock signal 2310 corresponding to the mark length "5", as shown by (d) and (e) in FIG. 18. As shown by (d) in FIG. 18, the frequency of the counter clock signal 2310 is higher than the frequency of the sector mark signal 1411. If the counted number is comprised within a predetermined range, the counter No. 1 determines that the first mark 2811 (mark length "5") has been detected accurately, and releases and sends the detection signal 2211 to the judging circuit 2202, as illustrated in FIG. 17. Similarly, the counter No. 2 detects a non-mark 2812 (non-mark length "3") and releases the detection signal 2212. Counters No. 3 to No. 8 then detect successively the marks 2811 and non-marks 2812 of the sector mark section 1701 and release the detection signals 2213 to 2218. Finally, the counter No. 9 detects the last mark 2811 (mark length "5") and releases the detection signal 2219. The judging circuit 2202 determines whether the nine results obtained as the marks 2811 and non-marks 2812 are detected, totally or partially coincide with the recording pattern of the sector mark section 1701, and examines the sequence of marks 2811 and non-marks 2812. The sector mark detection signal 2110 shown in FIG. 16, consequently changes to the low level ("0") only when it was determined that a sector mark section 1701 was detected. With the above arrangement, the sector mark detection signal 2110 may thus be used as a synchronizing signal corresponding to each sector 3004.

1.2.3 Various signals generated in the timing generating circuit

The generation process of various signals in the timing generating circuit 1501 will be described hereinafter with reference to FIG. 19.

As shown by (b) in FIG. 19, the sector mark detection signal 2110 released by the sector mark detection circuit 2101, goes to the low level when the sector mark section 1701 of the pre-formatted section 3003 (see (a) in FIG. 19) is detected. Therefore, one drop to the low level of the sector mark detection signal 2110 corresponds to one sector 3004. As shown by (c) in FIG. 19, the counter 2102 shown in FIG. 16 starts to count simultaneously with the falling of the sector mark detection signal 2110, and releases a low level counter output signal 2111 when the count equals a predetermined number. The timer circuit 2104 shown in FIG. 16 starts to count simultaneously with the falling of the sector mark detection signal 2110, and counts a number equivalent to the count of the counter 2102 plus a predetermined count corresponding to the length of one sector 3004. As a result, as shown by (d) in FIG. 19, the falling edge of an output signal 2112 released by the timer circuit 2104 coincides approximately with the falling edge of the counter output signal 2111 of the following sector 3004. As shown by (e) in FIG. 19, the output signal 2114 of the window generating circuit 2105 shown in FIG. 16 uses the sector mark detection signal 2110 falling edge as a reference and goes in the low level with a prescribed window width in the vicinity of the falling edge of the sector mark detection signal 2110 for the following sector 3004. Provision is made such that the timing judge signal 2115, i.e. the output signal of the judging circuit 2106 shown in FIG. 16, stays in the high level as shown by the solid line in FIG. 19(f), when the sector mark detection signal 2110 falls while the output signal 2114 released by the window generating circuit 2105 is in the low level. On the other hand, if the sector mark detection signal 2110 does not fall while the output signal 2114 is in the low level, the timing judge signal 2115 changes to the low level, as shown by the broken line in FIG. 19(f). Therefore, the timing Judge signal 2115 serves for determining whether the sector mark section 1701 was detected within the permissible range.

Figure 16:
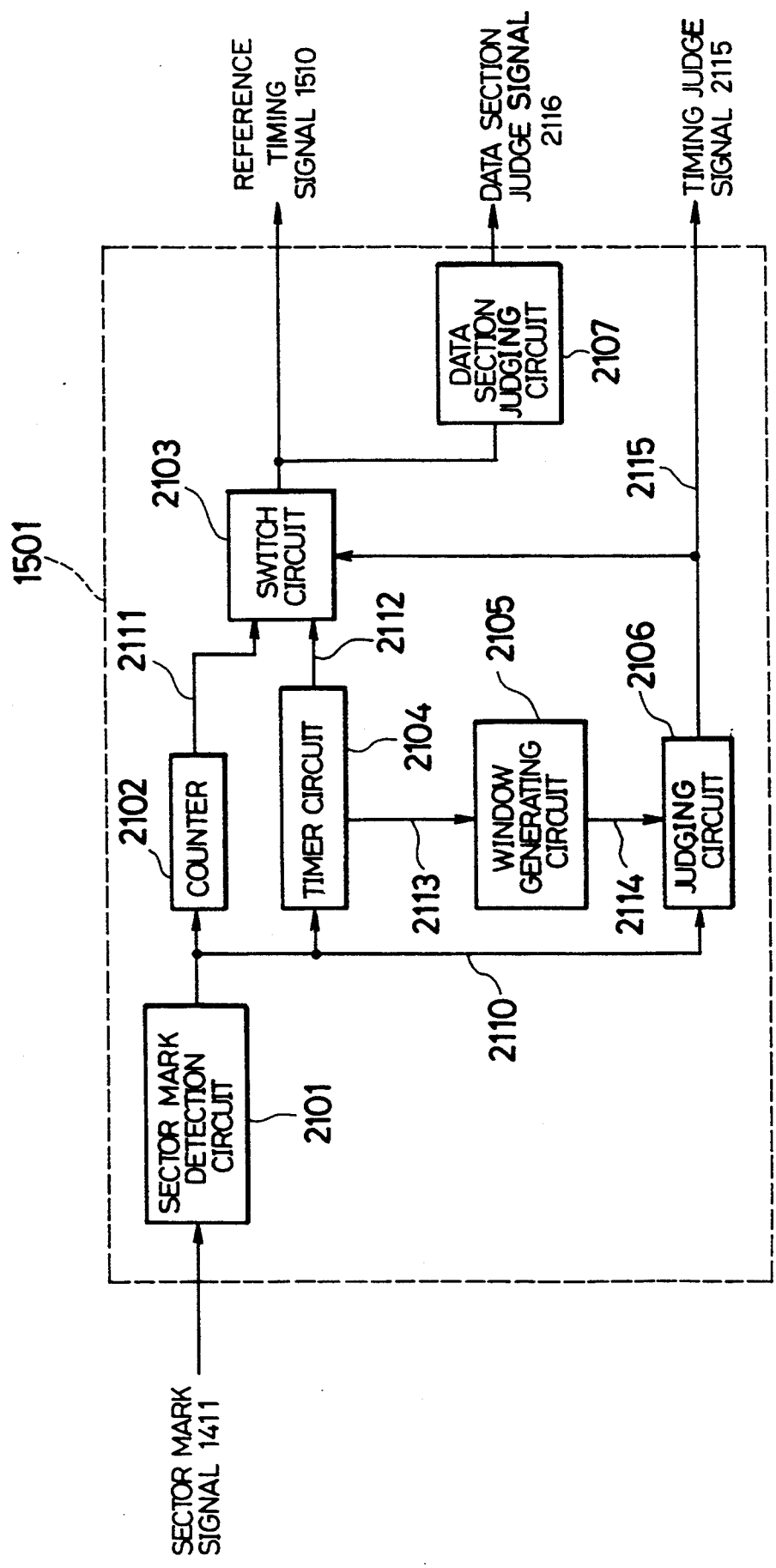

Based on the timing judge signal 2115 supplied from the judging circuit 2106, the switch circuit 2103 shown in FIG. 16 selects the counter output signal 2111 when the sector mark section 1701 was detected in the permissible range, and selects the timer circuit output signal 2112 when a detection error occurred. As a result, even when an error occurred in the detection of the sector mark section 1701 causing the counter output signal 2111 to be missing, compensation is made by the timer circuit output signal 2112 that was generated based on the prior sector 3004. Such an arrangement thus permits the reference timing signal 1510 to be released accurately, as shown by (g) in FIG. 19.

The reference timing signal 1510 obtained as described above is then transmitted to the data section judging circuit 2107 shown in FIG. 16. The data section judging circuit 2107 is constituted by one type of counter, and starts counting simultaneously with the drop to the low level of the reference timing signal 1510 that was fed thereto from the switch circuit 2103. The data section judging circuit 2107 releases a data section judge signal 2116 that goes in the low level for the data section 1703 of the MO section 3002, as shown by (h) in FIG. 19. In other words, the data section Judge signal 2116 may be used as a signal for distinguishing the pre-formatted section 3003 and the MO section 3002.

Figure 12:
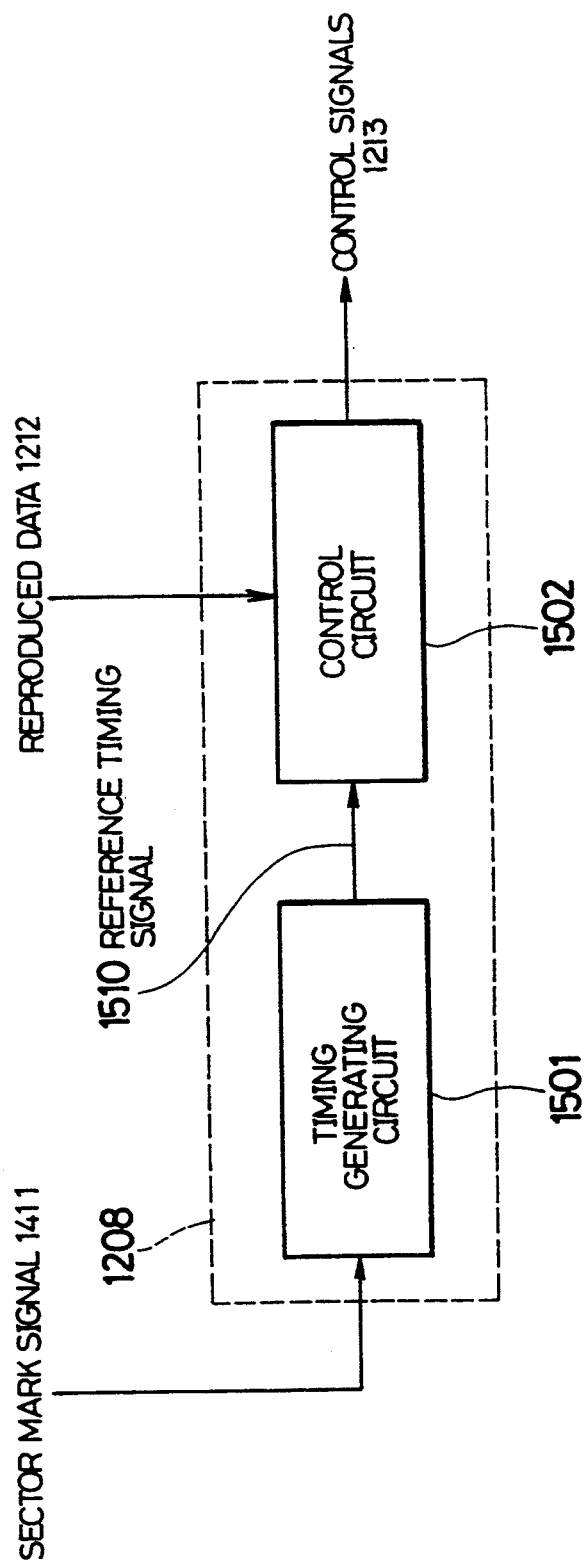

The reference timing signal 1510, the timing judge signal 2115 and the data section Judge signal 2116 that were produced as described above, are transmitted to the control circuit 1502 shown in FIG. 12. The various control signals 1213 are generated in the control circuit 15022 based on the signals 1510, 2115 and 2116.

1.2.4 Signal processing circuit

The configuration and operation of the signal processing circuit 1401 shown in FIG. 11 will be discussed with reference to FIG. 20 and FIG. 21.

Figure 20:
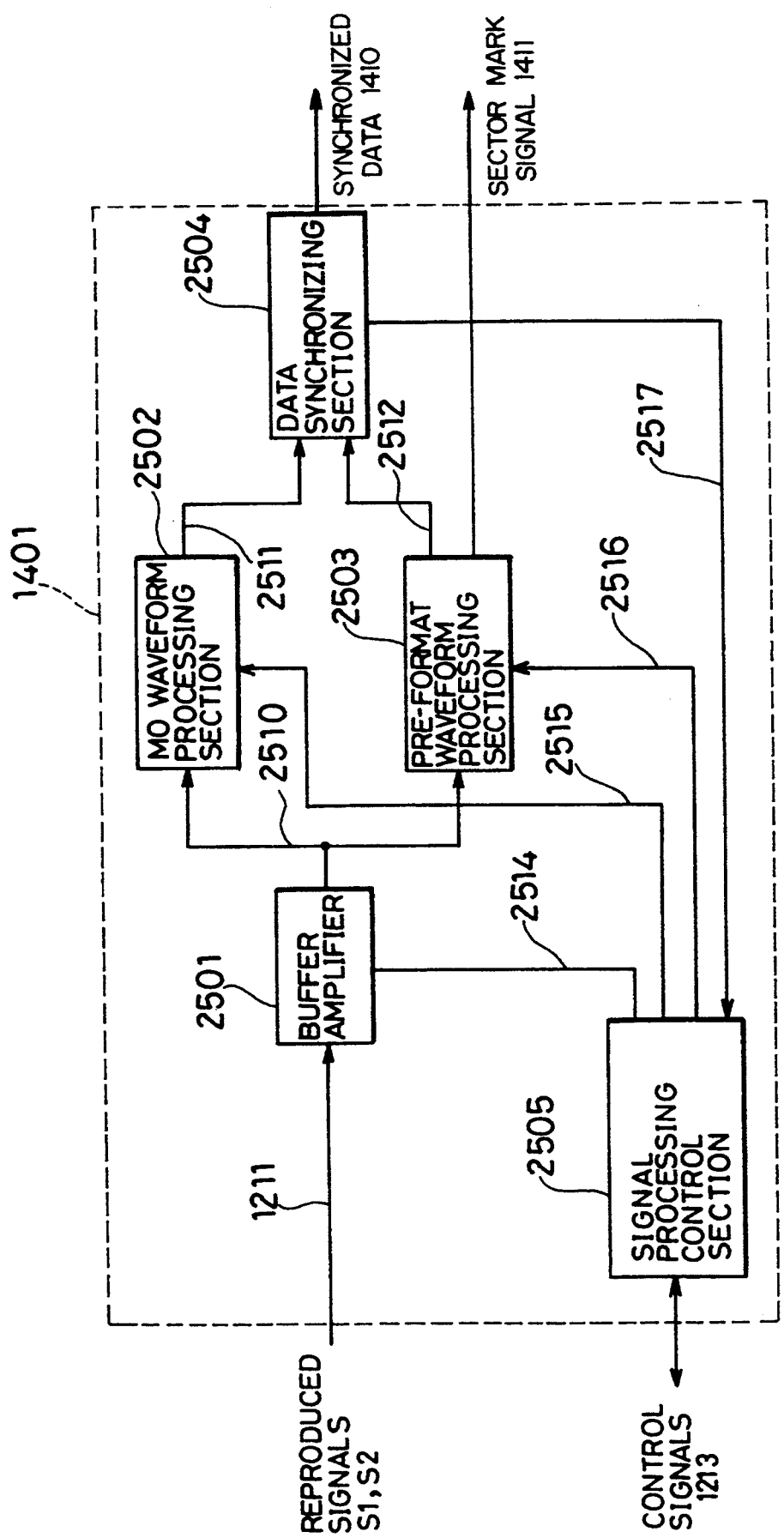

The reproduced signals 1211 (i.e. the reproduced signals S1 and S2) that was read from the magneto-optical disk 1201 are fed into a buffer amplifier 2501 housed within the signal processing circuit 1401, as illustrated in FIG. 20. The buffer amplifier 2501 releases output signals 2510 that are sent to a MO waveform processing section 2502 and a pre-format waveform processing section 2503. The difference of the reproduced signals S1 and S2 is determined in the MO waveform processing section 2502 and a binary MO signal 2511 is generated in accordance with the marks 2809 and non-marks 2810 recorded in the MO section 3002. Meanwhile, in the pre-format waveform processing section 2503, the sum of the reproduced signals S1 and S2 is determined, and a binary ID signal 2512 is generated in accordance with the marks 2811 and non-marks 2812 of the pre-formatted section 3003. The binary signals 2511 and 2512 are fed into a data synchronizing section 2504. The binary signals 2511 and 2512 are synchronized with a clock signal in a PLL (Phase Locked Loop) housed in the data synchronizing section 2504, and the synchronized data 1410 is generated and sent to the demodulating circuit 1402 (shown in FIG. 11). The pre-format waveform processing section 2503 generates the sector mark signal 1411 that is sent to the timing generating circuit 1501 (shown in FIG. 12). A signal processing control section 2505 receives and releases various control signals 2514 to 2517 from and to the different sections of the signal processing circuit 1401 and in addition receives and releases the control signals 1213 to and from the controller 1208 shown in FIG. 9.

Figure 21:
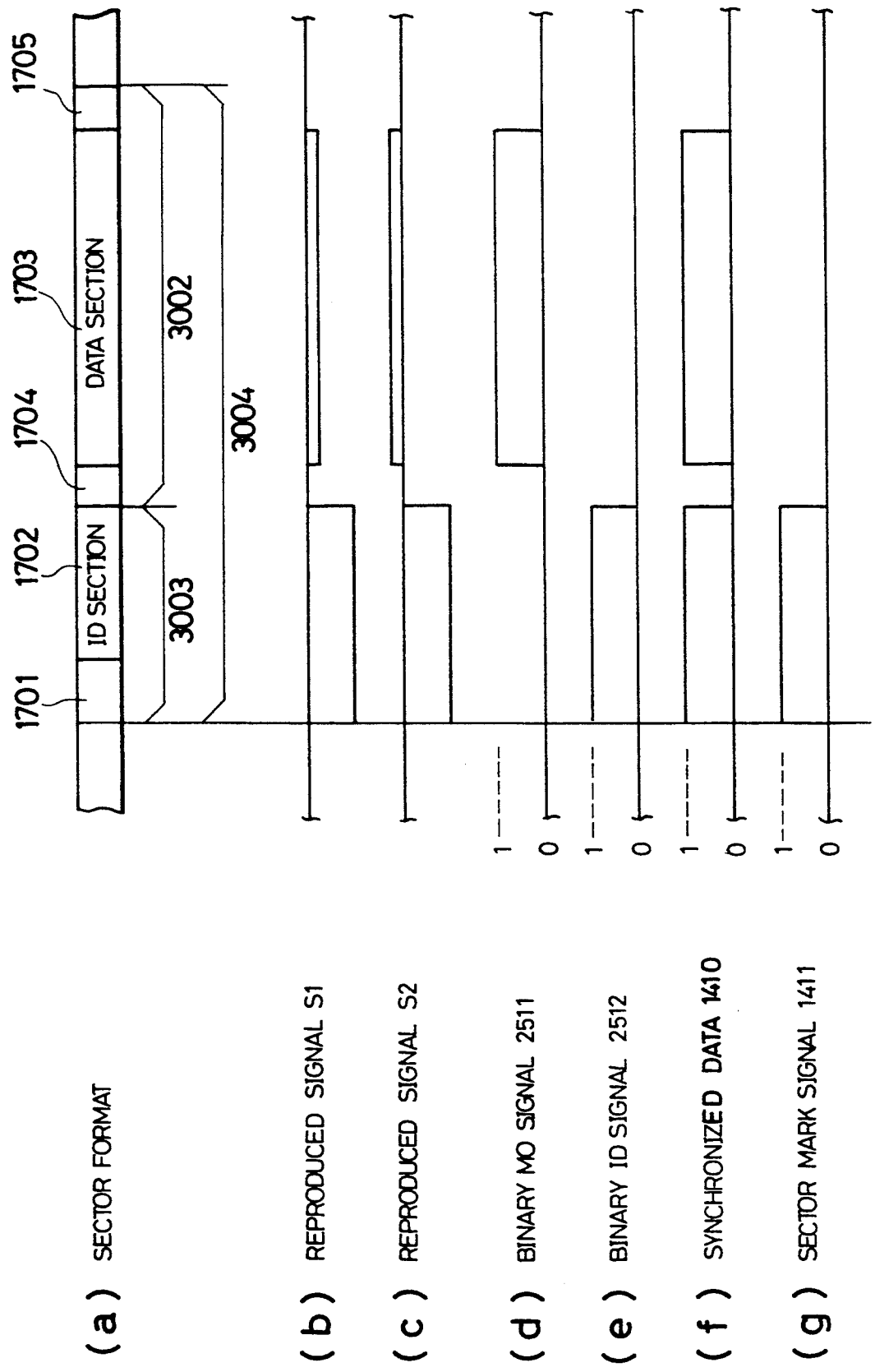

FIG. 21 illustrates the waveforms of signals generated in different sections of the signal processing circuit 1401. The MO signal corresponding to the information recorded in the MO section 3002 is isolated by determining the difference of the reproduced signals S1 and S2 shown by (b) and (c) in FIG. 21, in the MO waveform processing section 2502. The MO signal is further converted into a binary signal, and the binary MO signal 2511 that is in the low level for sections other than the MO section 3002 as shown by (d) of FIG. 21, is generated. The signal corresponding to the information recorded the pre-formatted section 3003 is isolated by determining the sum of the reproduced signals S1 and S2 in the pre-format waveform processing section 2503. This signal is further converted into a binary signal and the binary ID signal 2512 and sector mark signal 1411 that are in the low level for sections other than the pre-formatted section 3003 as shown by (e) and (g) in FIG. 21, are generated.

Figure 33:
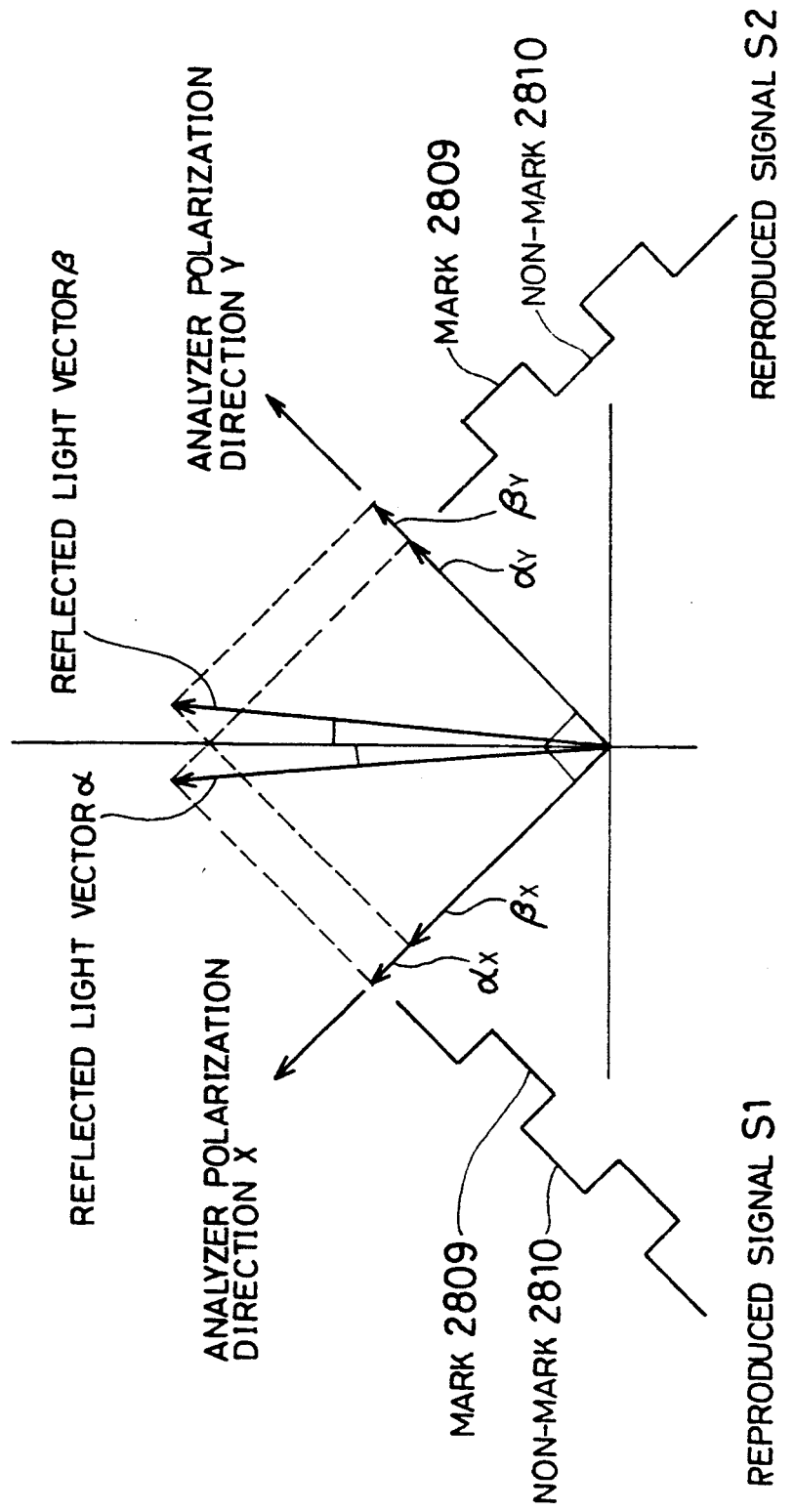

The reason why the information recorded in the MO section 3002 and the information recorded in the pre-formatted section 3003 can be separated by determining the difference and tile sum of the reproduced signals S1 and S2, lies in the fact that, as illustrated in FIG. 33 the reproduced signals S1 and S2 have opposite polarities in the MO section 3002, while, as illustrated in FIG. 34 their polarities coincide in the pre-formatted section 3003. The binary MO signal 2511 and the binary ID signal 2512 are converted into the synchronized data 1410 in the data synchronizing section 2504, as shown by (f) in FIG. 21 that is synchronized with the clock signal of the data synchronizing section 2504.

1.3 Configuration and operation of the essential section of the present invention: MO waveform processing section The MO waveform processing section 2502, i.e the vital section of the present invention will be covered in details hereinbelow. First, the configuration of the MO waveform processing section 2502 will be illustrated schematically.

Figure 2:
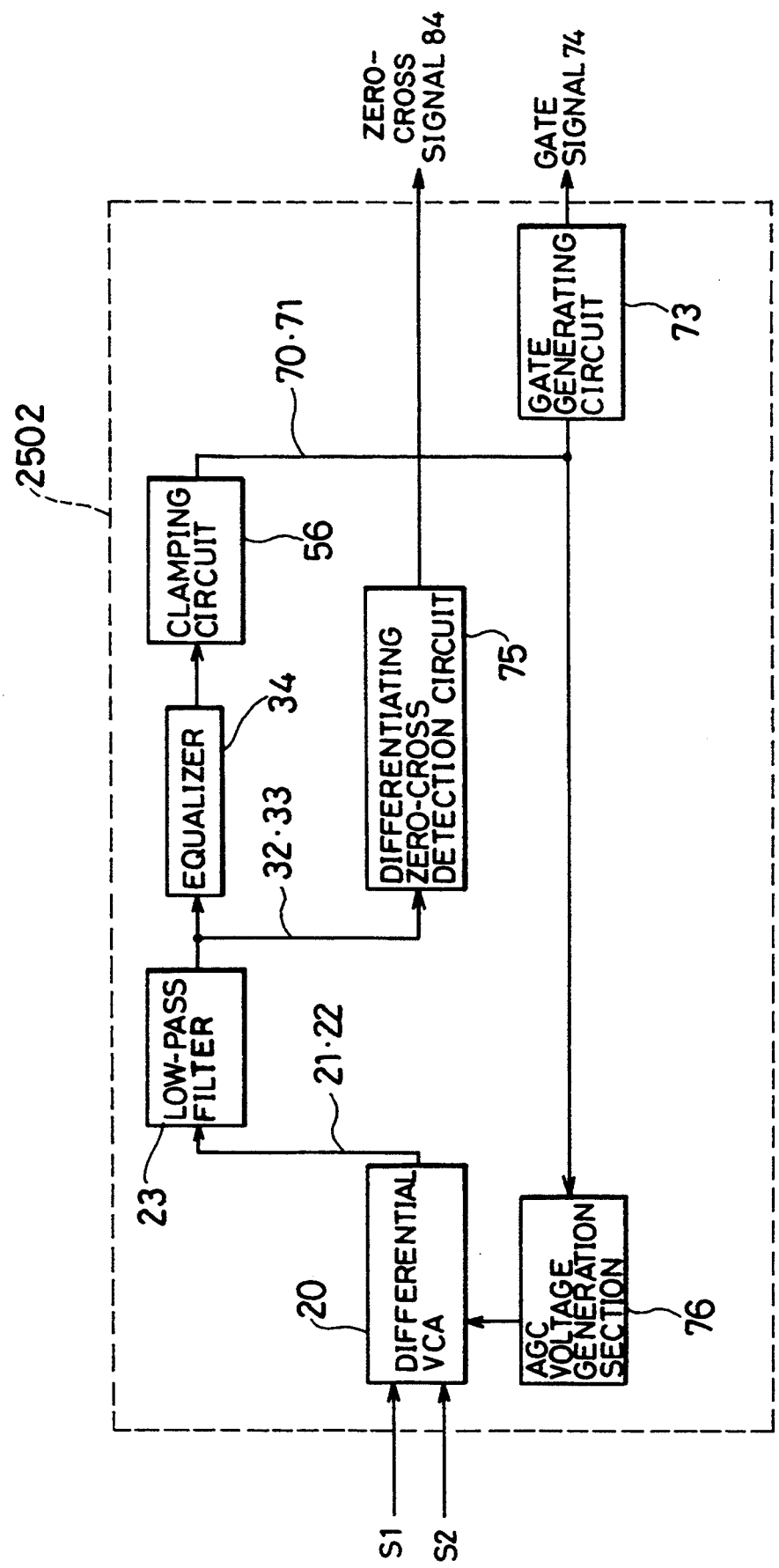

As illustrated in FIG. 2, the MO waveform processing section 2502 comprises a differential VCA (voltage controlled amplifier) 20. The output signals 2510 released by the buffer amplifier 2501 shown in FIG. 20 and representing the reproduced signals S1 and S2, are fed into the differential VCA 20. The difference of the reproduced signals S1 and S2 is determined in the differential VCA 20, and the analog MO signal only is extracted. The MO signals are amplified based on an AGC voltage drawn from an AGC voltage generation section 76 to be described later. Resulting output signal 21 (derived from S1-S2) and output signal 22 (derived from S2-S1) are sent from the differential VCA 20 to a low-pass filter 23. Output signals 32 and 33 released by the low-pass filter 23 are sent to an equalizer 34 serving as equalizing means, and a differentiating zero-cross detection circuit 75 serving as zero-cross signal generating means. The analog signals whose high-frequency components were emphasized in the equalizer 34, further pass through a clamping circuit 56 where their upper limit levels or lower limit levels are adjusted, and are sent to a gate generating circuit 73. In the gate generating circuit 73, the analog signal that went through the above signal processing, is converted into a binary signal and a gate signal 74 is generated, as will be covered in detail later. The clamping circuit 56 releases and sends output signals 70 and 71 to the AGC voltage generation section 76. The AGC voltage generation section 76 generates the AGC voltage, i.e. the control voltage serving for adjusting the amplification degree in the differential VCA 20, by means of a feedback loop. Eventually, the amplification degree in the differential VCA 20 is adjusted in accordance with the amplitude of the output signals 70 and 71 released by the clamping circuit 56, in other words by the amplitude of the output signals 21 and 22 released by the differential VCA 20. Meanwhile, the output signals 32 and 33 released by the low-pass filter 23 are also sent to the differentiating zero-cross detection circuit 75 where, as will be described later, a zero-cross signal 84 is generated. Provision is made such that in a gate circuit 77, serving as binary reproduced signal generating means, shown in FIG. 7 and to be described later, a binary reproduced data signal 87 (similar to the binary MO signal 2511 described with reference to FIGS. 20 and 21) is produced based on the gate signal 74 and the zero-cross signal 84.

1.3.1 Differential VCA

The configuration of the different sections of the MO waveform processing section 2502 will be covered in details hereinbelow.

Figure 3:
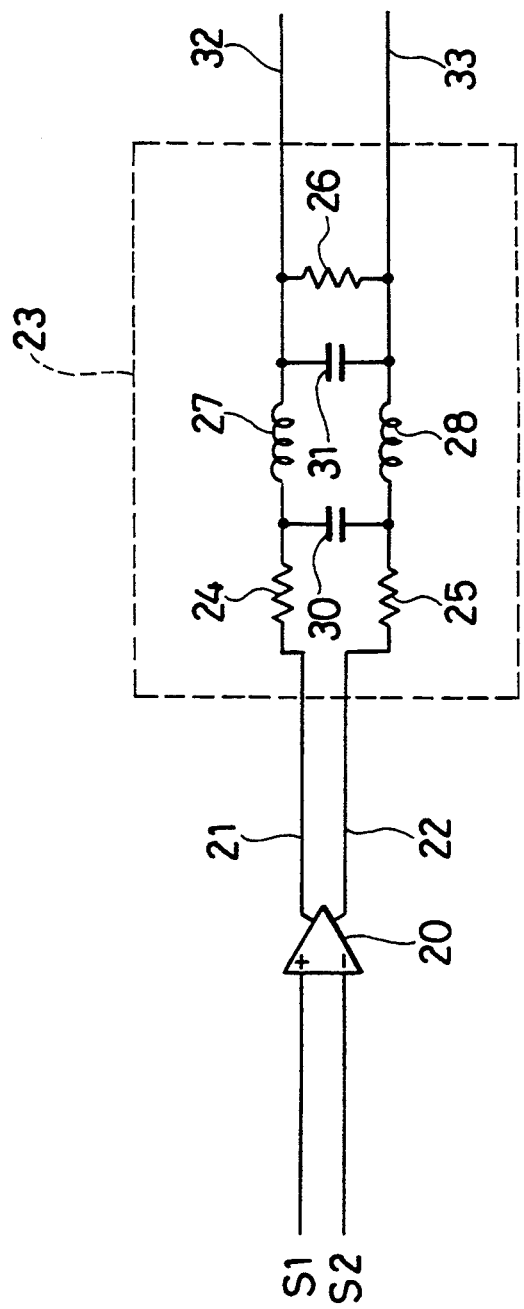

As illustrated in FIG. 3, the differential VCA 20 is an amplifier of the differential input/differential output type, and releases two output signals 21 and 22 that have mutually different polarities. The low-pass filter 23 is meant mainly for improving the signal-to-noise ratio and is composed of, for example, resistances 24 to 26, coils 27 and 28, and capacitors 30 and 31. In the low-pass filter 23, the high-frequency noise contained in the output signals 21 and 22 released by the differential VCA 20 are eliminated and two output signals 32 and 33 having mutually different polarities are generated. The output signals 32 and 33 are sent to the equalizer 34 as well as to the differentiating zero-cross detection circuit 75.

1.3.2 Equalizer

Figure 4:
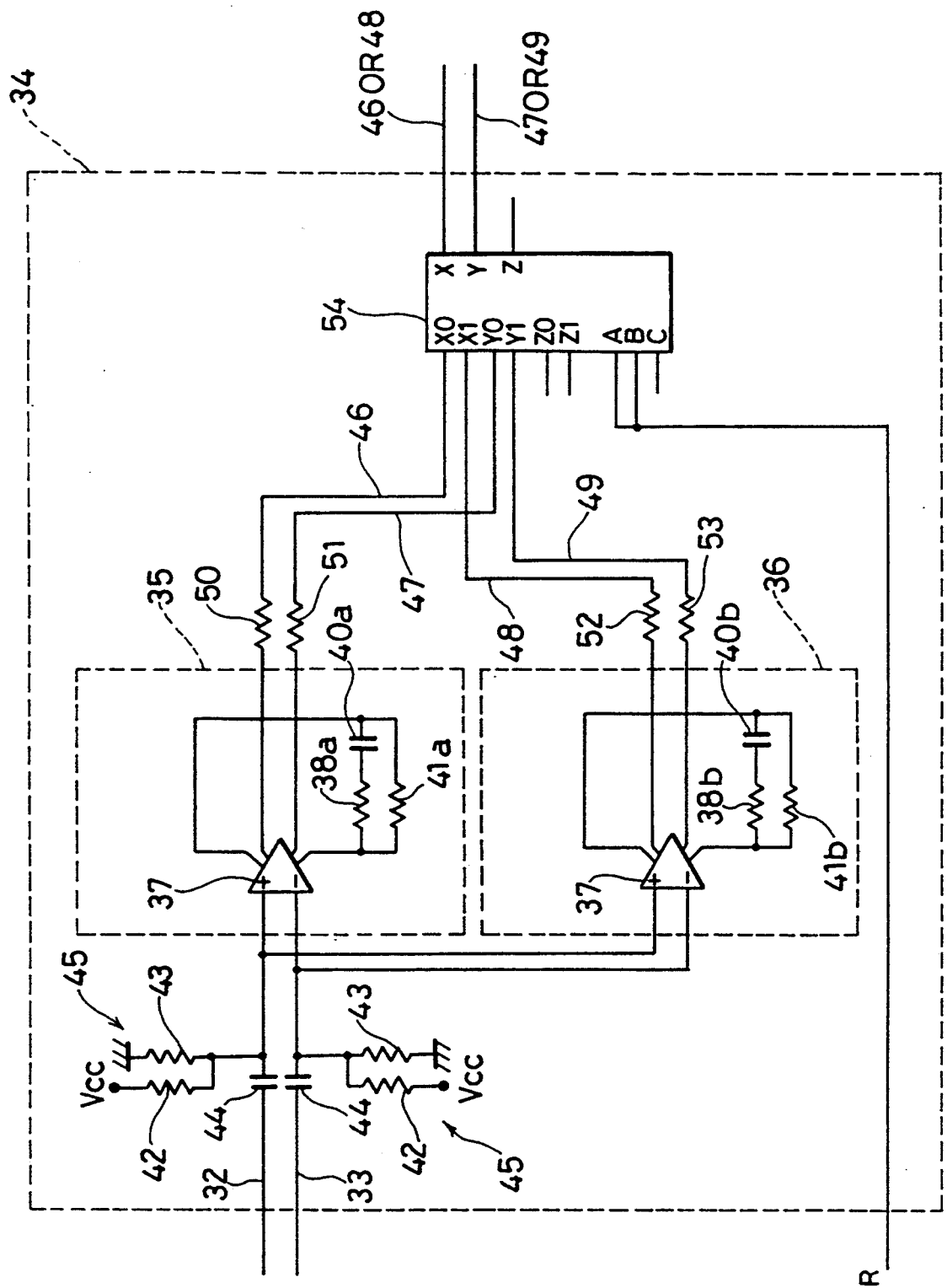

Specifically, the equalizer 34 comprises for example a first equalizing section 35 and a second equalizing section 36 provided with different equalizing characteristics, as shown in FIG. 4. Now description will be made of the first equalizing section 35. The first equalizing section 35 comprises a differential amplifier 37 of the differential input/differential output type (for example the amplifier NE 592 manufactured by the American company Signetics). Provision is made such that the output signal 32 released by the low-pass filter 23 is fed into the positive polarity input terminal of the differential amplifier 37, and the output signal 33 is fed into the negative polarity input terminal of the differential amplifier 37. High-pass filters 45 should preferably be installed between the low-pass filter 23 and the equalizer 34 for each of the output signals 32 and 33. Each of the high-pass filters 45 comprise for example resistances 42 and 43, and a capacitor 44. The output terminal of the capacitor 44 is connected to a ground through the resistance 43, and in addition is connected to a power source (Vcc) through the resistance 42, the resistances 42 and 43 being mounted in parallel. Between the two gain control terminals of the differential amplifier 37 there are connected a resistance 38a and a capacitor 40a, connected in series, and a resistance 41a connected in parallel with the above resistance 38a and capacitor 40a. The equalizing characteristics of the first equalizing section 35 are determined by the values of the resistances 38a and 41a, and the value of the capacitor 40a.

Meanwhile, in the second equalizing section 36, the resistances 38a and 41a, and the capacitor 40a mounted in the first equalizing section 35 have been replaced with resistances 38b and 41b and a capacitor 40b respectively. In such a manner, the characteristics of the second equalizing section 36 are different from the characteristics of the first equalizing section 35.

The output signal 46, generated as the amplitude of the high-frequency components contained in the output signals 32 and 33 was emphasized and the difference of the output signals 32 and 33 was determined, is released from the positive polarity output terminal of one of the differential amplifiers 37, is fed into the input terminal X0 of an analog switch 54 through a resistance 50, as switching means (for example the analog switch MC 14053 manufactured by Motorola). An output signal 47 generated in the above differential amplifier 37 such that its polarity is different from the polarity of the output signal 46 is released from the negative polarity output terminal of the differential amplifier 37, and is fed into the input terminal Y0 of the analog switch 54 through a resistance 51. Two output signals 48 and 49 released from the other differential amplifier 37 in a manner similar as described above, are fed respectively into input terminals X1 and Y1 of the analog switch 54 through resistances 52 and 53. In the analog switch 54, one of the output signals 46 and 48 is selected by means of a changeover signal 55 and is sent to the clamping circuit 56 shown in FIG. 2 through the output terminal X. The changeover signal 55 is released by the control circuit 1502 shown in FIG. 12. In addition, one of the output signals 47 and 49 is selected in a similar manner and sent to the clamping circuit 56 through an output terminal Y. The changeover control of the equalizing sections 35 and 36 will be covered in details later.

1.3.3 Clamping circuit

Figure 5:
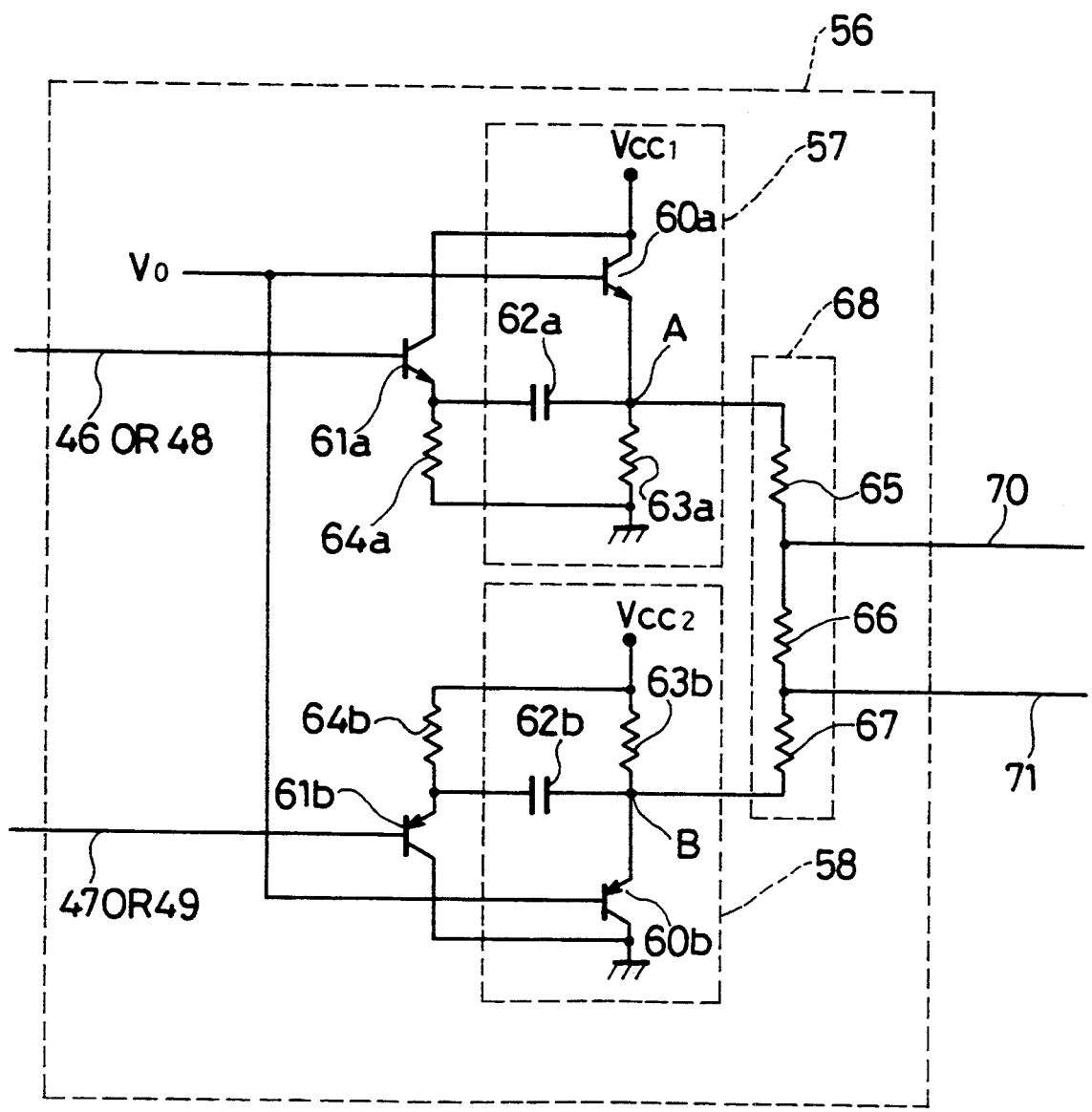
Figure 6:
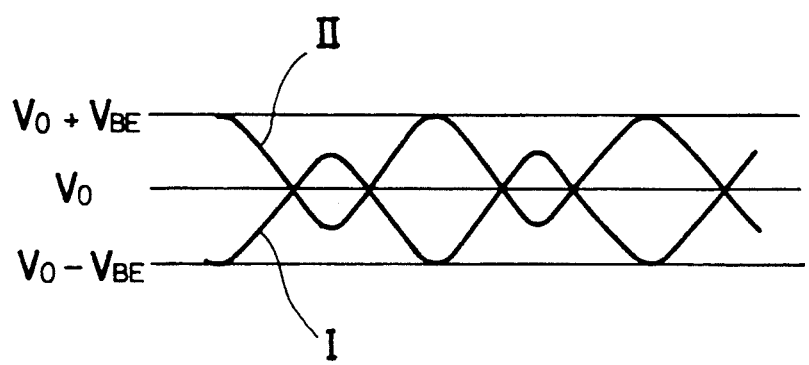
Figure 6:
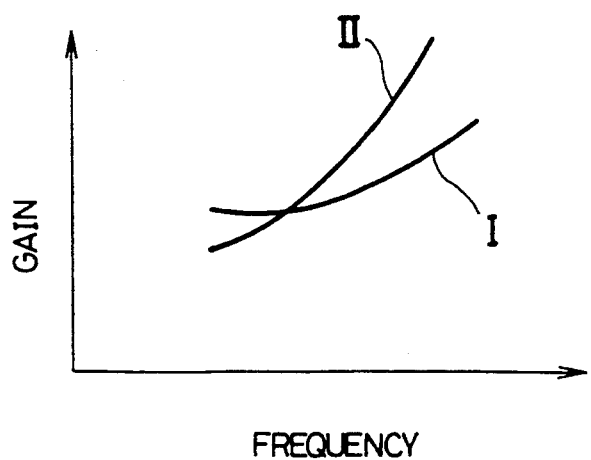

The clamping circuit 56, employed as clamping means, comprises a first clamping section 57 where the output signal 46 or output signal 48 is fed to, and a second clamping section 58 where the output signal 47 or 49 is fed to, as illustrated in FIG. 5. The following refers to the first clamping section 57. The first clamping section 57 comprises a first transistor 60a of the n-p-n type. The first transistor 60a is arranged such that a clamping control voltage $V_0$ is applied to the base, the collector is connected to a D.C. power source $V_{cc1}$, and the output of the emitter forms the output of the first clamping section 57. The first clamping section 57 further comprises a second transistor 61a of the n-p-n type. The transistor 61a is arranged such that one of the output signals 46 and 48 from the equalizer 34 is fed into the base thereof, and the collector is connected to the above power source $V_{cc1}$. A capacitor 62a is connected and installed between the emitters of both transistors 60a and 61a. The emitter of the transistor 60a is connected to a ground through a resistance 63a, and similarly the emitter of the transistor 61a is connected to a ground through a resistance 64a.

The circuit configuration of the second clamping section 58 is substantially similar to the circuit configuration of the first clamping section 57. However, the second clamping section 58 is equipped with a first transistor 60b and a second transistor 61b, both of the p-n-p type. The second transistor 61b is arranged such that one of the output signals 47 and 49, that have polarities opposite to the polarities of the output signals 46 and 48, is fed into the base thereof. A capacitor 62b is connected and installed between the emitters of transistors 60b and 61b, and in addition each of the emitters is connected to a D.C. power source $V_{cc2}$ through a resistance 63 and a resistance 64b respectively. The collectors of the transistors 60b and 61b are connected to a ground.

In the first clamping section 57, the alternating current components of the output signal 46 or output signal 48 are transmitted via the second transistor 61a and the capacitor 62a to a node A connecting the emitter of the first transistor 60a and the capacitor 62a. The lower limit level of the voltage at the node A is equal to a clamping voltage $(V_0 - V_{BE})$ whose value corresponds to the subtraction of a voltage $V_{BE}$ between the base and the emitter of the first transistor 60a, from a clamping control voltage $V_0$ applied to the first transistor 60a. As a result, the voltage at the node A that serves as output section of the first clamping section 57, changes as illustrated by a waveform I in FIG. 6(a).

In the second clamping section 58, the alternating current components of the output signal 47 or output signal 49 are transmitted via the second transistor 61b and the capacitor 62b to a node B of the emitter of the first transistor 60b and the capacitor 62b. The upper limit level of the voltage at the node B is equal to a clamping voltage $(V_0 + V_{BE})$ whose value corresponds to the sum of the clamping control voltage $V_0$ and the voltage $V_{BE}$ between the base and the emitter of the first transistor 60b. As a result, the voltage at the node B that serves as output section of the second clamping section 58, changes as illustrated by a waveform II in FIG. 6(a).

Figure 7:
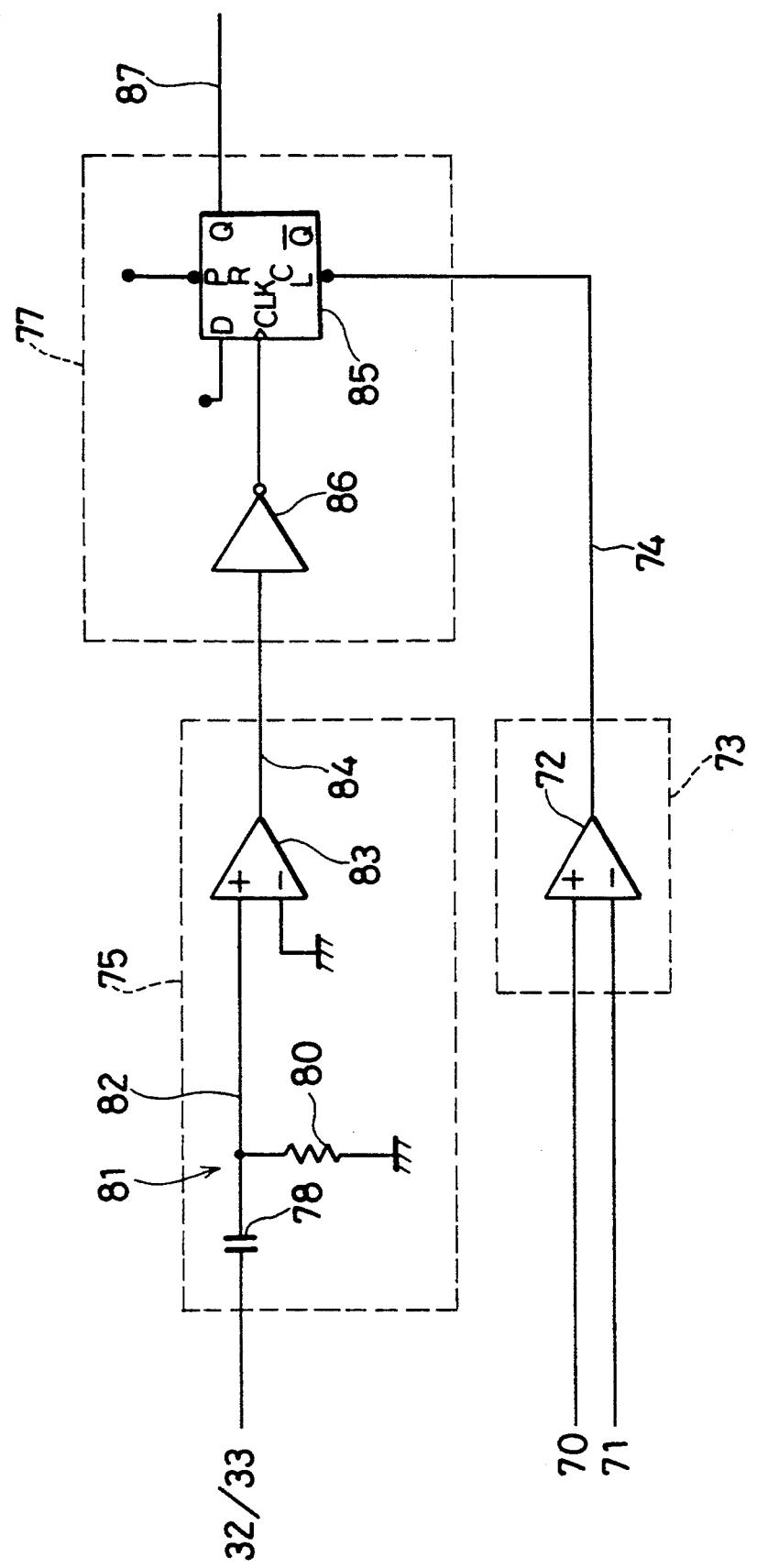

The point A and the point B are connected to each other through a voltage divider 68 composed of resistances 65 to 67 connected in series. The output of the node A is released as output signal 70 from the node between the resistance 65 and the resistance 66, after its voltage was divided. Similarly, the output of the node B is released as output signal 71 from the node between the resistance 66 and 67, after its voltage was divided. The output signals 70 and 71 have mutually different polarities, and are sent to the gate generating circuit 73 composed of a comparator 72, as shown in FIG. 7. The output signals 70 and 71 as shown by I and II in FIG. 6(a) that have mutually reverse polarities, are compared in the gate generating circuit 73 serving as gate signal generating means, and a gate signal 74 as shown by (g) in FIG. 1, is generated.

1.3.4 Differentiating zero-cross detection circuit

The differentiating zero-cross detection circuit 75 shown in FIG. 2 serving as zero-cross signal generating means, comprises for example a differentiating circuit 81 and a comparator 83, as illustrated in FIG. 7. The differentiating circuit 81 is composed of a capacitor 78 and a resistance 80 that is connected by one end to a ground, and differentiates the output signals 32 or 33 released by the low-pass filter 23. The comparator 83 comprises a positive polarity input terminal where the differentiated signal 82 released by the differentiating circuit 81 is fed to, and a negative input terminal that is connected to a ground. The comparator 83 detects the timing at which the differentiated signal 82 crosses the zero level by comparing the differentiated signal 82 and the ground voltage. Provision is made such that the comparator 83 releases and sends to the gate circuit 77 a zero-cross signal 84, as shown by (f) in FIG. 1, that goes in the high level when the differentiated signal 82 is beyond the zero level.

The gate circuit 77 comprises a flip-flop 85 (for example, the flip-flop 74LS74 manufactured by the American company Texas Instruments). Provision is made such that the gate signal 74 released by the comparator 73 is fed into the clear terminal CL of the flip-flop 85, and that the zero-cross signal 84 released by the comparator 83 is fed to the clock terminal CLK through an inverter 86. When the zero-cross signal 84 falls from the high level to the low level, the voltage of the clock input terminal CLK of the flip-flop 85 rises from the low level to the high level, through the action of the inverter 86. If, at this time, the gate signal 74 fed into the clear input terminal CL is in the high level, an output signal released by the output terminal Q changes from the low level to the high level and stays in this state until the gate signal 74 returns to the low level. The flip-flop 85 is thus a circuit where the logical product of a signal derived from the inverted zero-cross signal 84, and the gate signal 74, is determined. The output signal released from the output terminal Q corresponds to a digital reproduced data signal 87 as shown by (h) in FIG. 1. At this stage, the conversion of the analog MO signal (shown by (c) in FIG. 1) derived from the difference of S1 and S2 that was determined in the differential VCA 20 shown in FIG. 2, into a binary signal is achieved.

1.3.5 Waveforms of signals generated in the MO waveform processing section

The description of the configuration of the MO waveform processing section 2502 shown in FIG. 2 is now completed and waveforms of signals generated in the different sections of the MO waveform processing section 2502 will be discussed with reference to FIG. 1.

Suppose now that information is recorded in the form of a sequence of marks 2809 as shown by (b) in FIG. 1, in accordance with modulated data shown by (a) in FIG. 1. The modulated data was for example modulated through the 2-7 modulation method mentioned earlier. A laser spot 2701 is irradiated on sequence of marks 2809 and the difference of the reproduced signals S1 and S2 is determined and the reproduced signals S1 and S2 are amplified in the differential amplifier VCA 20 (shown in FIG. 3). An analog reproduced signal is consequently produced as MO signal, as shown by (c) in FIG. 1. This analog reproduced signal is one of the output signals 21 and 22 (for example, output signal 21) that are released by the differential VCA 20 and that have mutually different polarities.

The analog reproduced signal is sent into the differentiating zero-cross detection circuit 75 via the low-pass filter 23, and is differentiated in the differentiating circuit 81 comprised in the differentiating zero-cross detection circuit 75, shown in FIG. 7. A differentiated signal 82 is thus obtained as shown by (d) in FIG. 1. The differentiated signal 82 is further sent into the comparator 83 where the zero-cross signal 84 as shown by (f) in FIG. 1, is generated as described above.

The output signals 21 and 22 released by the differential VCA 20 pass through the low-pass filter 23, the equalizer 34 and the clamping circuit 56. One of the output signals 70 and 71 (corresponding to the one of the output signals 21 and 22 shown by (c) in FIG. 1; here it is supposed that the output signal 70 corresponds to the output signal 21) released by the clamping circuit 56 shows a waveform such as illustrated by (e) in FIG. 1. Namely, the output signal 70 released by the clamping circuit 56 shows a waveform corresponding to the waveform of the analog reproduced signal shown by (c) in FIG. 1 where the amplitude of the high-frequency areas are emphasized by means of the equalizer 34. As a result, a satisfactory peak-to-peak value may be obtained even for parts corresponding to parts where the interval between adjacent marks 2809 is narrow such as in sections E and F shown in FIG. 1(c), i.e. sections E and F of FIG. 1(e).

Here, the reason for the implementation of the clamping circuit 56 will be described.

The difference between an analog reproduced signal (for instance (c) in FIG. 1) of an optical memory device such as a magneto-optical disk device, and an analog reproduced signal of other reproducing devices such as for example a magnetic disk reproducing device, lies in the fact that the peak level of the analog reproduced signal of the optical memory device, that corresponds to the binary code "1" of the modulated data, varies only in a positive direction (upwards direction of the figure), as shown by (c) in FIG. 1. Therefore, the use of the clamping circuit 56 facilitates the generation of a gate signal that goes in the high level for parts where the binary code is "1", as shown by (g) in FIG. 1. Indeed, the peak level of the analog reproduced signal that corresponds to the binary code "0" of the modulated data, varies only in a negative direction (downwards direction of the figure). Therefore, the lower limit level of the analog reproduced signal can be controlled by the clamping means 56 to a given constant voltage. This arrangement thus permits to produce a binary gate signal with a relatively simple circuitry. As described above, the clamping circuit 56 is an effective means for obtaining a gate signal in all optical memory device.

The pair of output signals 70 and 71 released by the clamping circuit 56 is sent to the gate generating circuit 73 where the gate signal 74 such as (g) in FIG. 1 is generated. The gate signal 74 corresponds to the converted binary signal of one of the output signals 70 and 71 released by the clamping circuit 56 and having mutually reverse polarities, i.e. the output signal such as shown by (e) in FIG. 1 (for example output signal 70). The zero-cross signal 84 and the gate signal 74 are sent to the flip-flop 85 where the reproduced data signal 87 is generated as binary reproduced signal as shown by (h) in FIG. 1. Namely, the reproduced data signal 87 changes from the low level to the high level when the zero-cross signal 84 happens to fall while the gate signal 74 is in an ON state, i.e. in the high level, and returns from the high level to the low level simultaneously with the change of the gate signal 74 to the OFF state, i.e the low level. Reproduced data as shown by (i) in FIG. 1 is derived from the rising positions of the reproduced data signal 87.

As described above, in the magneto-optical disk device of the present embodiment, the equalizer 34, that is the outstanding feature of the present invention, is mounted ahead of the gate generating circuit 73. This arrangement enables the output signals 70 and 71 that passed through the equalizer 34 and the clamping circuit 56 to have sufficient peak-to-peak values even in high-frequency areas (E section and F section), as shown by (e) in FIG. 1. Accordingly, the gate signal 74 can be generated accurately. In other words, the inconvenience arising as the gate signal 74 does not fall when it should do so in high-frequency areas, is eliminated. The reproduced data signal 87 shown by (h) in FIG. 1 is thus generated accurately, thereby enabling the reproduced data shown by (i) in FIG. 1 to be derived accurately from the reproduced data signal 87 and to coincide with the modulated data shown by (a) in FIG. 1.

In the present embodiment, the equalizing section 35 (36) of the equalizer 34 shown in FIG. 4, comprises the resistances 38a and 41a (38b and 41b) and the capacitor 40a (40b). However, with such an arrangement, slight variations might occur in the waveform of the output signals released by the equalizer 34. As a result, as shown by the dotted line in FIG. 1(e) the phases of the waveforms of the output signals 70 and 71 released by the clamping circuit 56, might be slightly shifted in the phase progressing direction with respect to the output signals 21 and 22 released by the differential VCA 20. This phenomenon arises because the group delay characteristic of the equalizer 34 equipped with the above resistances and capacitors, is not uniform. Slight variations consequently occur in the rising and falling timing of the gate signal 74, as shown in FIG. 1(g), as well as in the falling timing of the reproduced data signal 87, as shown by the dotted line in FIG. 1(h). However, as the equalizer 34 is mounted ahead of the gate generating circuit 73, and not ahead of the differentiating zero-cross detection circuit 75, variations do not occur in the falling timing of the zero-cross signal 84 shown by (f) in FIG. 1. Therefore, variations do not occur either in the rising timing of the reproduced data signal 87. The reproduced data shown by (i) in FIG. 1 is generated based on the rising timing of the reproduced data signal 87. The reproduced data is thus generated accurately as long as variations do not occur in the rising timing of the reproduced data signal 87.

As described above, the present embodiment employs the equalizer 34 that is relatively inexpensive and that can be made easily in the form of an integrated circuit. The reproduced data can be generated accurately by installing the equalizer 34 ahead of the gate generating circuit 73 and not ahead of the differentiating zero-cross detection circuit 75.

Moreover, the configuration and operation of the MO waveform processing section 2502 also applies to the pre-format waveform processing section 2503 except that in that case, a summing VCA is employed instead of the differential VCA.

1.3.6 Switching control executed by the equalizer

The switching control of the equalizer 34 for changing from the equalizing section 35 to the equalizing section 36 and vice versa will be described hereinbelow.

Figure 8:
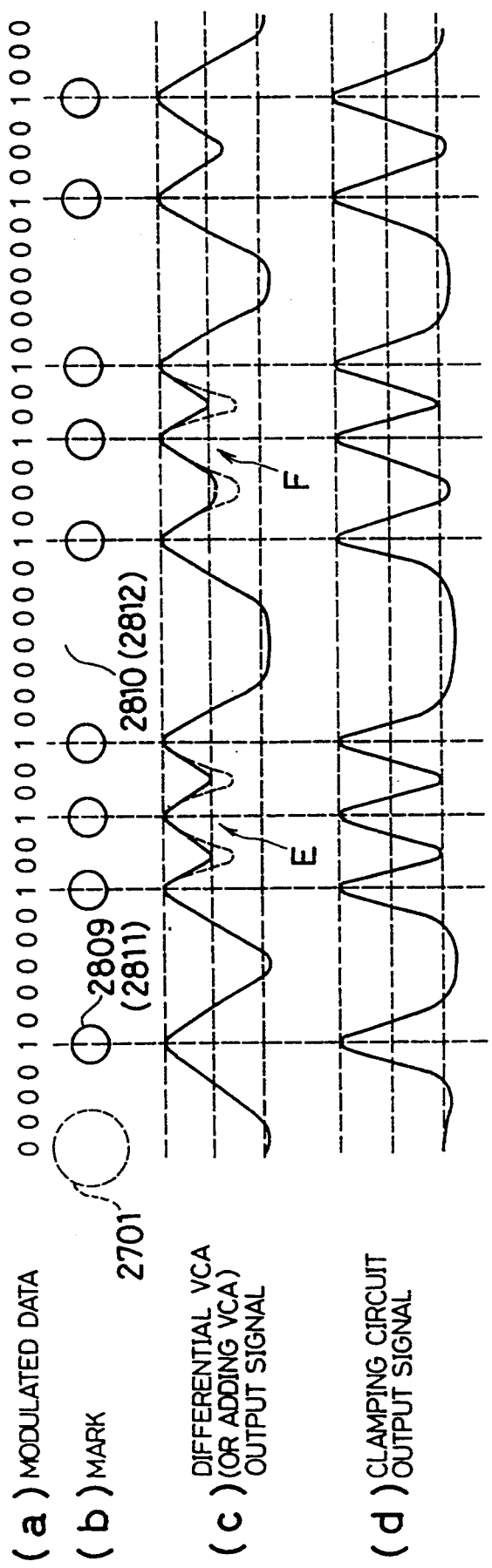

When the CAV (Constant Angular Velocity) method is adopted as the spindle motor 1202 shown in FIG. 9 drives the magneto-optical disk 1201 to rotate, the recording density of MO signals in the MO section 3002, increases as it gets closer to the inner periphery. In other words, supposed that the modulated data shown by (a) in FIG. 8 is recorded in the forms of sequences of recording marks 2809, as shown by (b) in FIG. 8, in the inner section and the outer section of the magneto-optical disk 1201, the interval separating the centers of adjacent marks 2809 widens as it get closer to the outer periphery. This, in turn, is likely to cause the peak-to-peak value of the output signal read from the marks 2809 and released by the differential VCA 20 such as shown by (c) in FIG. 8 to increase. Namely, because of the difference in recording density, in high-frequency areas E and F as shown in FIG. 8(c), the peak-to-peak value is not likely to increase in inner sections, as shown by the solid line, but can become relatively large in some instances in outer sections, as shown by the dotted line. In such a case, the insufficiency of the peak-to-peak value in high-frequency areas needs to be adequately compensated in the equalizer 34 for an inner section but needs to be compensated only slightly for an outer section.

Hence, two equalizing sections 35 and 36 having different characteristics are accommodated in the equalizer 34. Provision is made such that the gain of the first equalizing section 35 is set in accordance with the frequency of the output signal released by the differential VCA 20 as shown by the curve (I) in FIG. 6(b), and the gain of the second equalizing section 36 is set as shown by the curve II. The gain of the second equalizing section 36 is set such as to be greater than the gain of the first equalizing section 35 when the frequency of the output signal is high. Therefore, if the first equalizing section 35 is used for the outer section of the magneto-optical disk 1201 (where the recording density is relatively low), and the second equalizing section 36 is used for the inner section (where the recording density is relatively high and thereby the frequency of the output signal increases), the output signals derived from the same modulated data and that passed through the equalizer 34 and further through the clamping circuit 56, present similar waveforms as shown by (d) in FIG. 8 for the inner and outer sections. In the present embodiment, the magneto-optical disk 1201 was divided in two, i.e. an inner section and outer section, and two equalizing sections 35 and 36 were correspondingly accommodated. However, the equalizer 34 may also be provided with more than three equalizing sections.

1.3.7 Another clamping circuit

Figure 22:
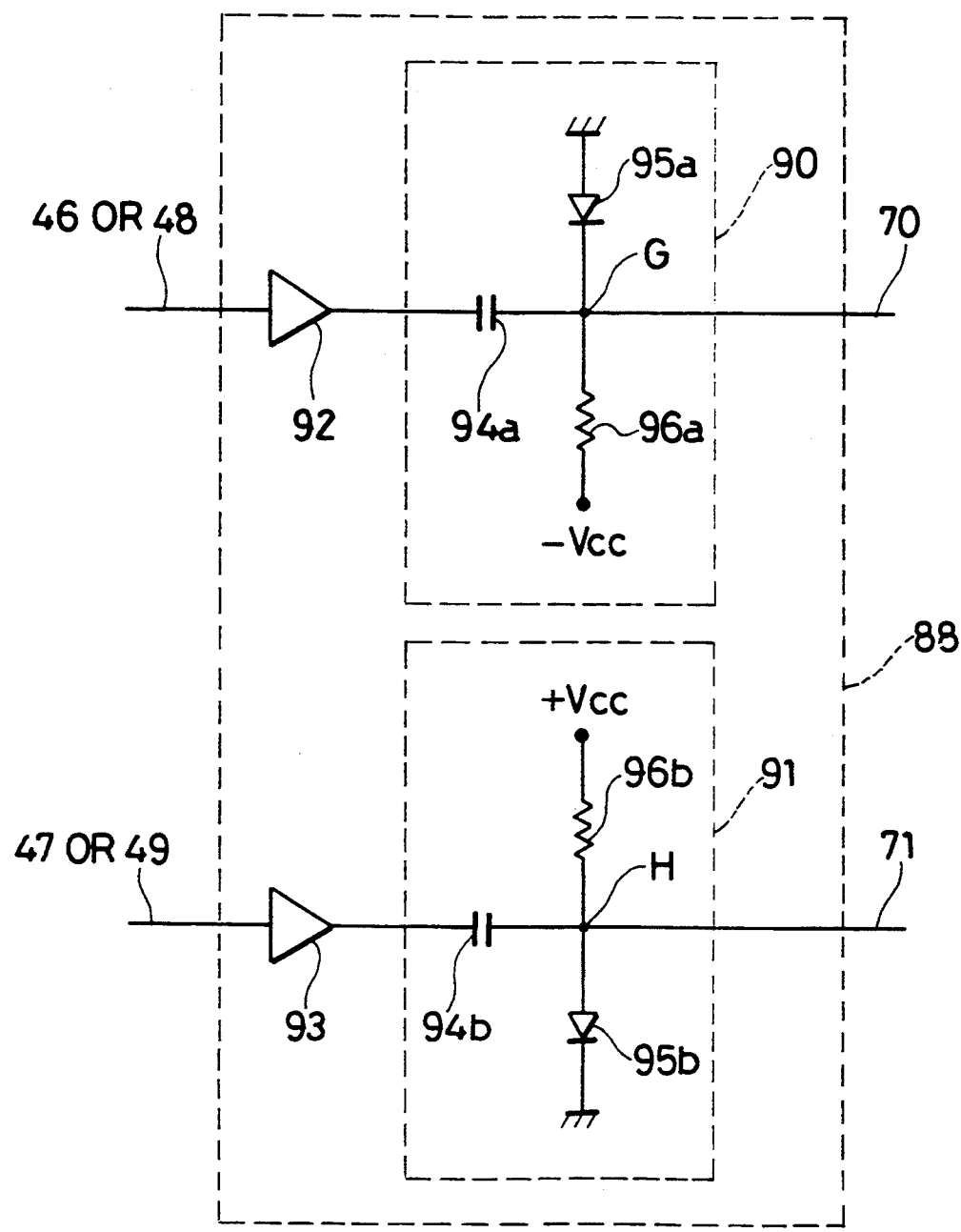
Figure 23:
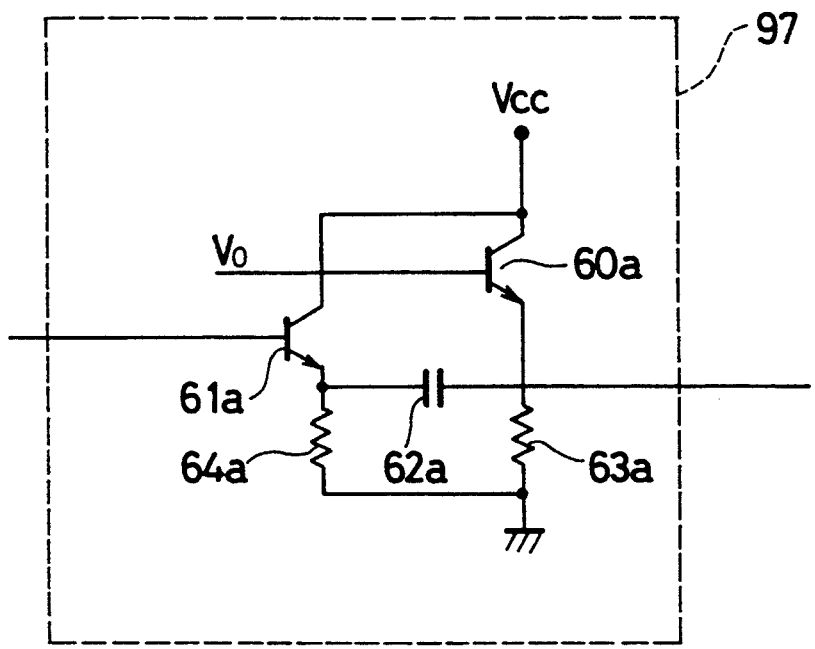

In the above embodiment, a clamping circuit 88 shown in FIG. 22 may be adopted, instead of the clamping circuit 56 shown in FIG. 5. The clamping circuit 88 comprises a first clamping section 90 where the output signal 46 or 48 released by the equalizer 34, is fed to through a buffer amplifier 92, and a second clamping section 91 where the output signal 47 or 49 released by the equalizer 34, is fed to through a buffer amplifier 93. The first clamping section 90 will be described hereinbelow. In the first clamping section 90, a capacitor 94a is connected to the equalizer 34 through a buffer amplifier 92. A G point, i.e. the output section of the clamping section 90 is connected to the output terminal of the capacitor 94a, is connected to ground through a diode 95a and in addition is connected to a D.C. power source ($-Vcc$) via a resistance 96a. The diode 95a allows the current to flow only from the ground toward the power source ($-Vcc$), and provision is made such that the lower limit level of the voltage at the point G, i.e. the lower limit level of the output signal 70 released by the first clamping section 90, is clamped in a clamp voltage in accordance with the forward voltage drop value of the diode 95a.

Meanwhile, the second clamping section 91 has a configuration similar to the first clamping section 90 and designed so as to receive of the output signals 47 and 49, the output signals 47 and 49 having polarities opposite from the output signals 46 and 48 polarities. Namely, a capacitor 94b is connected to the equalizer 34 through a buffer amplifier 93. All H point, i.e. the output section of the clamping section 91 is connected to the output terminal of a capacitor 94b, is connected to ground through a diode 95b, and in addition is connected to a D.C. power source ($+Vcc$) via a resistance 96b. The diode 95b allows the current to flow only from the power source ($+Vcc$) toward the ground. Provision is made such that the upper limit level of the voltage at the point H, i.e. the upper limit level of the output signal 71 released from the point H of the second clamping section 91, is clamped to a clamp voltage in accordance with the forward voltage drop value of the diode 95b.

In the present embodiment, the output signals released by the differential amplifier VCA 20, the low-pass filter 23, the equalizer 34 and the clamping circuit 56 were constituted by dual signals having mutually reverse polarities. However these output signals may be also constituted by single signals. When the above output signals are constituted by single signals, the clamping circuit employed may be arranged such as a clamping circuit 97 shown in FIG. 23. The clamping circuit 97 has a configuration similar to the configuration of the first clamping section 57 of the clamping circuit 56 shown in FIG. 5. The corresponding members will be thus designated by the same code and their description will be omitted.

1.3.8 Another equalizer

Figure 24:
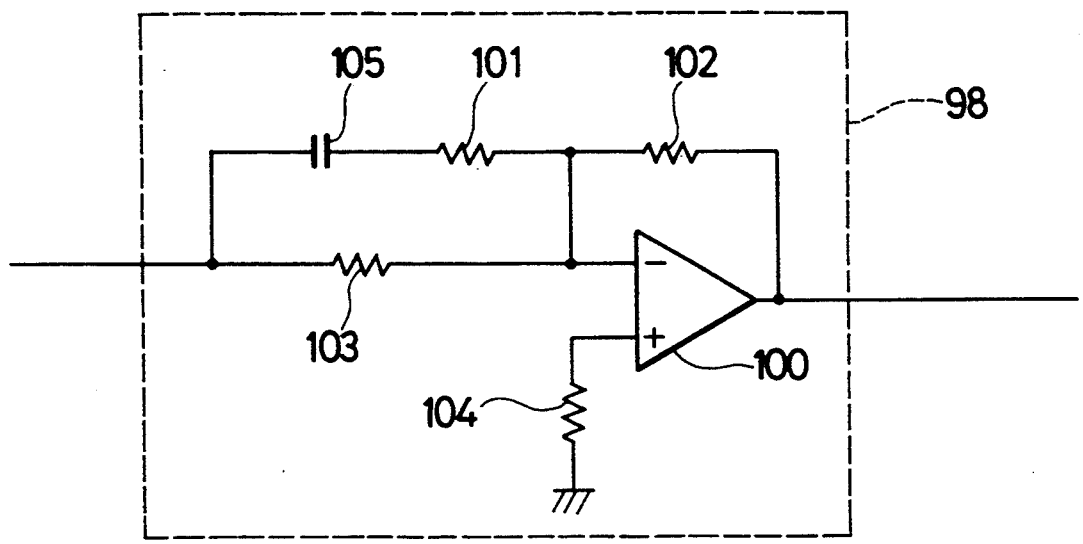

Similarly, when the above output signals are single signals, the equalizer 34 may be arranged such as for example an equalizer 98 shown in FIG. 24. Namely, in the equalizer 98, the inverting input terminal of a differential amplifier 100 is connected to a resistance 103. The non-inverting input terminal of the differential amplifier 100 is connected to a ground through a resistance 104. The output of the differential amplifier 100 is connected to the inverting input terminal through a feedback resistance 102. The resistance 103 is connected in parallel with a capacitor 105 and a resistance 101, the capacitor 105 and the resistance 101 being connected in series. Therefore, the peak-to-peak value in high-frequency areas of the single output signal released by the differential VCA 20 may be emphasized even when the equalizer 98 arranged as described above is adopted.

2. Second embodiment

2.1 MO waveform processing section

A second embodiment will be described hereinbelow.

Figure 25:
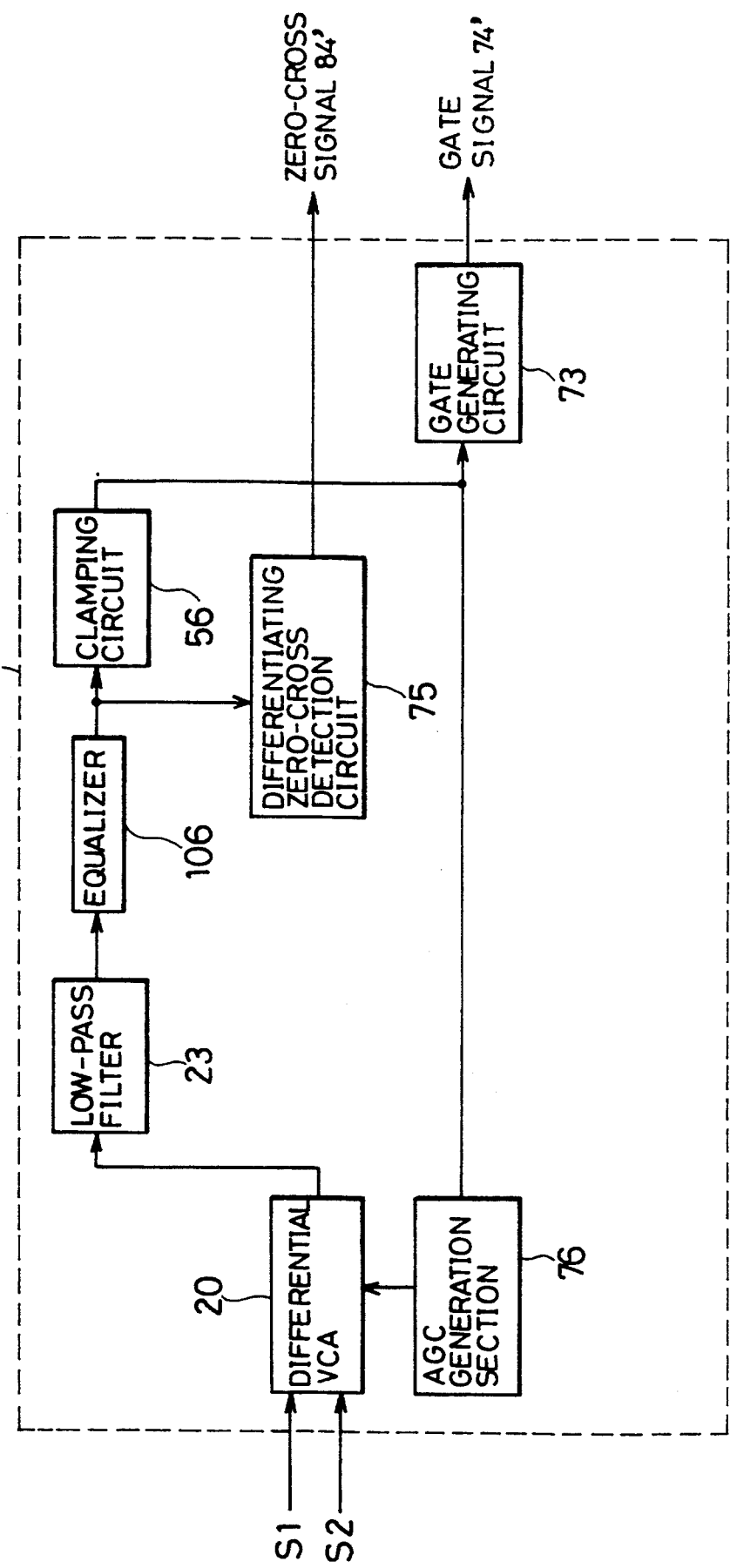

As illustrated in FIG. 25, a MO waveform processing section 2502' used in the second embodiment, is arranged such that an equalizer 106 serving as equalizing means, is installed ahead of a gate generating circuit 73 and a differentiating zero-cross detection circuit 75. Here, the composing parts of the MO waveform processing section 2502' having the same configuration as in the MO waveform processing section 2502 of the first embodiment will be designated with the same code and their description will be omitted. In the second embodiment, provision is made so that the output signals released by a differential VCA 20, a low-pass filter 23 and other members are exclusively constituted by single signals, in order to simplify the configuration of the circuitry.

2.1.1 Equalizer

Figure 26:
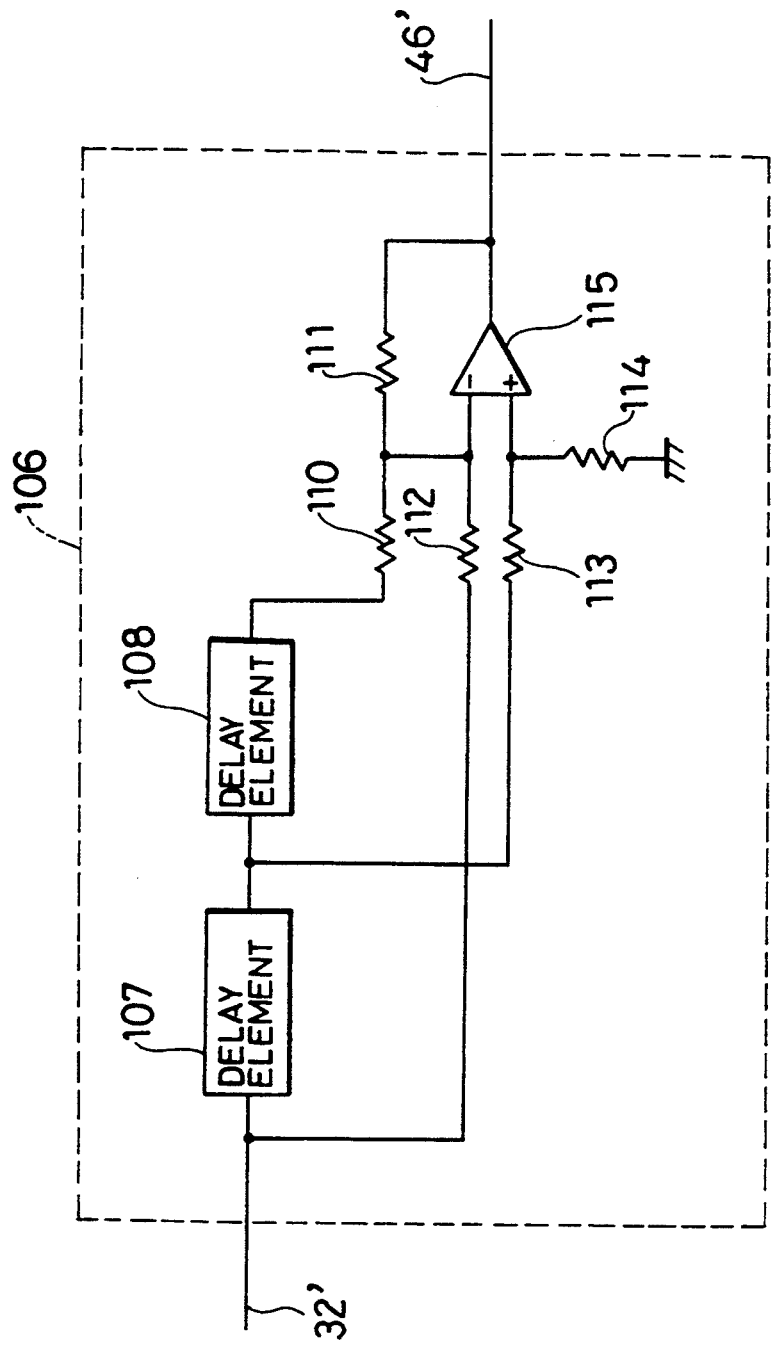
Figure 31:
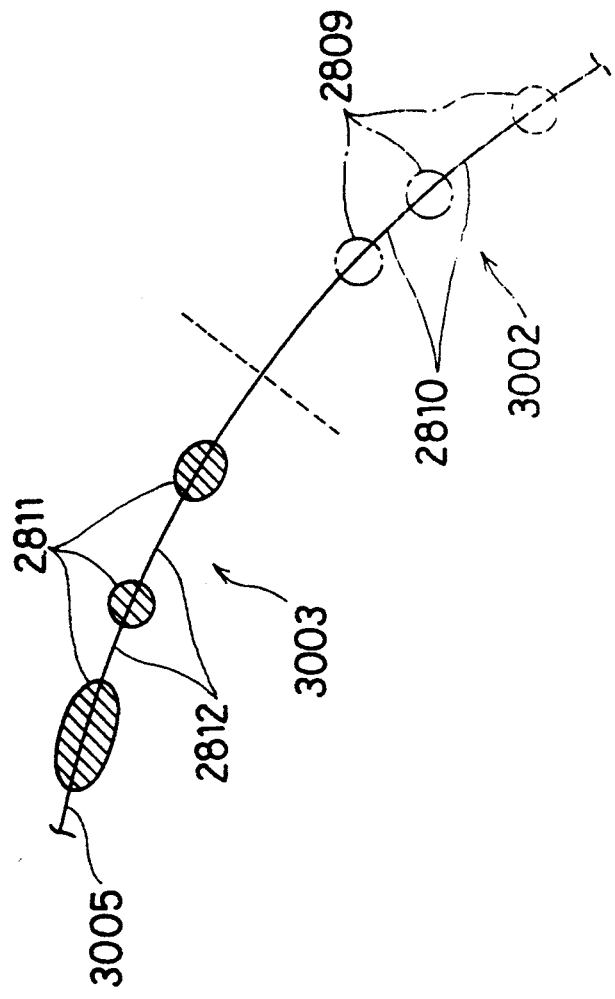
Figure 30:
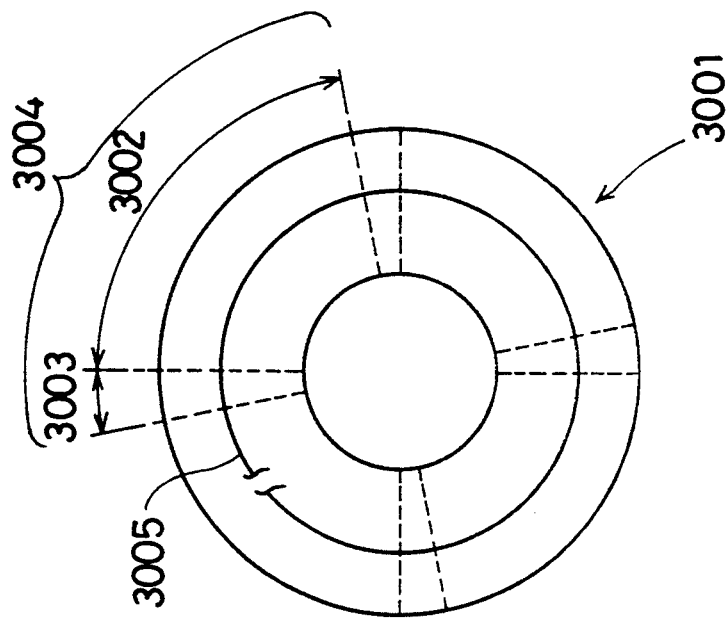
Figure 32:
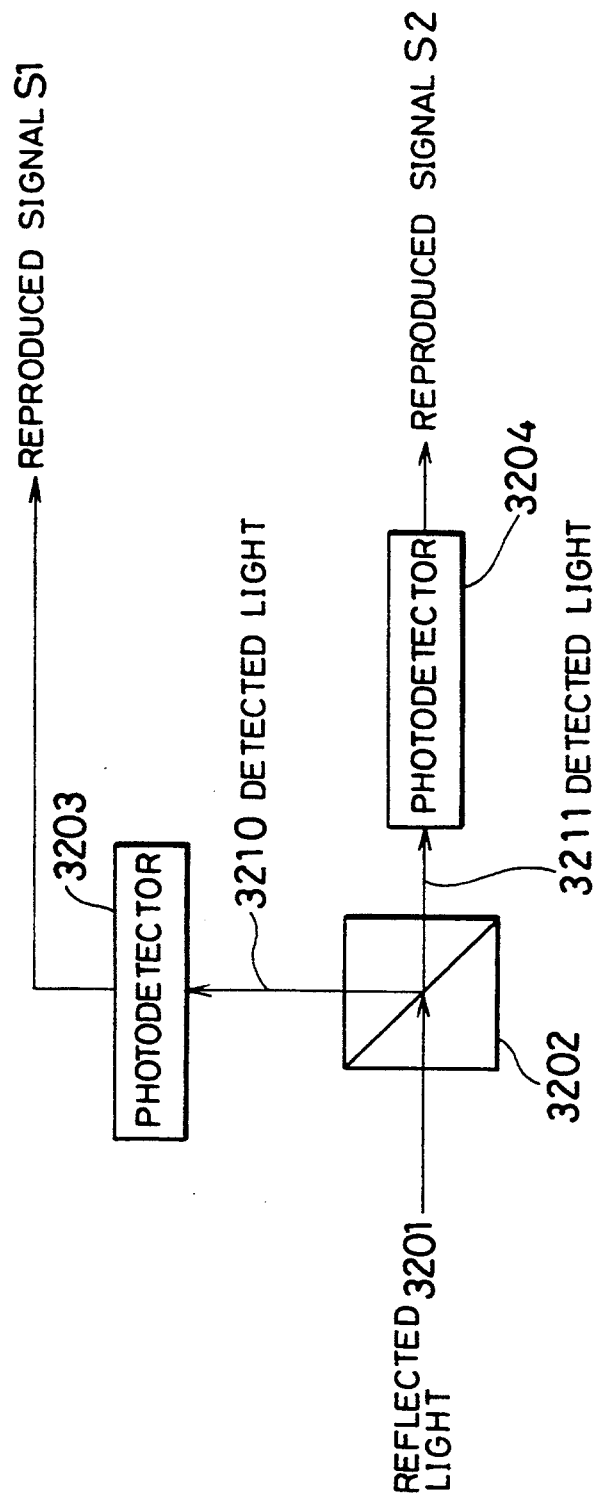

As illustrated in FIG. 26, the equalizer 106 of the second embodiment comprises only one equalizing section. The equalizer 106 is designed as a cosine equalizing circuit. Namely, an output signal 32' released by the low-pass filter 23 is supplied to the inverting input terminal of a differential amplifier 115 via a resistance 112. A delaying element 107, a delaying element 108 and a resistance 110 are connected in series to each other, and are connected in parallel to a resistance 112. The output signal 32' is supplied to the non-inverting input terminal of the differential amplifier 115 through the delaying element 107 and the resistance 113. The non-inverting input terminal of the differential amplifier 115 is connected to a ground through the resistance 114. The output of the differential amplifier 115 is connected to the inverting input terminal through a resistance 111. As described above, the group delay characteristic of the equalizer 106, that was designed as a cosine equalizing circuit, is uniform. The equalizer 106 thus presents the advantage that there is no variations in the waveform of the output signal 46'. The output signal 46' released by the equalizer 106 is then transmitted to the clamping circuit 56 and the differentiating zero-cross detection circuit 75.

2.2 Waveforms of signals generated in the MO waveform processing section

Waveforms of signals generated in the different sections of the MO waveform processing section 2502' of the second embodiment, are illustrated in FIG. 27.

The single output signal shown by (c) in Pig. 27 derived from the modulated data, the mark 2809 (2811), non-mark 2810 (2812) shown by (a) and (b) in FIG. 27 respectively, and released by the differential VCA 20, is similar for example to the output signal 21 of the first embodiment. The output signal released by the equalizer 106 as shown by (e) in FIG. 27, corresponds to the output signal released by the differential VCA 20 and shown by (c) in FIG. 27, whose amplitude was emphasized in high-frequency areas (I and J sections). Like in the first embodiment, in the present embodiment, the signal that passed through the equalizer 106 is sent to the differentiating zero-cross detection circuit 75 shown in FIG. 25, where it is differentiated in the differentiating circuit 81 (shown in FIG. 7) and a differentiated signal 82' shown by (d) in FIG. 27 is produced. The differentiated signal 82' is fed into the comparator 83 (shown in FIG. 7), and a zero-cross signal 84' as shown (f) in FIG. 27 is produced. Meanwhile, the output signal 46' is also sent through the clamping circuit 56 (FIG. 25) to a gate generating circuit 73' (shown in FIG. 25) where it is compared with a predetermined reference voltage and converted into a binary signal, and where a gate signal 74' as shown by (g) in FIG. 27 is produced. Like in the first embodiment, the zero-cross signal 84' and the gate signal 74' are sent to the flip-flop 85 shown in FIG. 7, and a digital reproduced data signal 87' (shown by (h) in FIG. 27) is generated. Reproduced data (shown by (i) in FIG. 27) is generated based on the rising timing of the reproduced data signal 87'.

In this second embodiment, the differentiated signal 82' and the zero-cross signal 84' are both derived from the output signal 46' released by the equalizer 106. However, here the equalizer 106 is designed such that variations do not occur in the waveform of the output signal 46'. As a result, the reproduced data signal 87' is generated accurately and corresponds to the sequence of marks 2809 whereby reproduced data can be generated accurately also.

In the above embodiments, data recorded in the pre-formatted section 3003 or MO section 3002 was read by determining the sum or difference of two reproduced signals S1 and S2. However, such an arrangement is not a requisite feature of the present invention. Furthermore, in the above embodiments, the track 1205 of the magneto-optical disk 1201 was constituted of a plurality of sectors 3004, each sector 3004 being composed of a pre-formatted section 3003 and a MO section 3002. However the present invention may be adopted for the reproducing information recorded on the magneto-optical disk 1201 with a format different from the above format. Moreover, the present invention may be adopted for reading information recorded not only on magneto-optical disks, but also on Re-writable optical disks such as phase transition type optical disks, or Direct Read After Write type optical disks whereon desired information can be recorded only once, as well as for reading information recorded on information recording mediums other than optical disks.

As described above, the information reproducing device in accordance with the present invention comprises gate signal generating means for generating a binary gate signal based on the peak value of an analog reproduced signal, and equalizing means for emphasizing the high-frequency components of the analog reproduced signal, and is arranged such that the equalizing means is installed ahead of the gate signal generating means. Such an arrangement permits to increase the peak-to-peak value of the high-frequency components of the analog reproduced signal, and thereby enables the binary gate signal derived from the analog reproduced signal to be generated more accurately. As a result, a binary reproduced signal can be generated more accurately, and the occurrence of reproduction errors can be reduced.

The equalizing means can be formed essentially by resistances and capacitors. Such an arrangement permits the equalizing means to be produced relatively inexpensively and in a compact size, and presents the advantage that the equalizing means can be made in the form of an integrated circuit easily.

Another information reproducing device in accordance with the present invention comprises clamping means mounted ahead of the above gate signal generating means, for setting the upper limit level or lower limit level of the analog reproduced signal to a fixed value. Such an arrangement permits the analog reproduced signal to be converted more accurately into a binary signal in accordance with its peak value in the gate signal generating means. As a result, the gate signal can be generated more accurately, and the occurrence of errors in the binary reproduced signal may be reduced.

The clamping means comprises, for instance, a first transistor arranged such that a clamping control voltage is fed to its base, and the output of its emitter serves as output of the clamping means, a second transistor to which base the analog reproduced signal is fed to, and a capacitor installed between and connected to the emitters of the first and second transistors.

With such an arrangement, the clamping level can be adjusted to a desired value by modifying the clamping control voltage.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An information reproducing device comprising:
zero signal generating means for receiving an analog reproduced signal derived from a signal that was detected by irradiating a light beam upon an information recording medium whereon information is digitally recorded, and that was subjected to a process for reducing noise of an information signal contained in said signal, for differentiating said analog reproduced signal and generating a differentiated signal, and for comparing said differentiated signal and the zero level of said differentiated signal and generated a zero-cross signal as binary signal,
equalizing means for generating an analog equalized reproduced signal by emphasizing the amplitude of frequency components present in said analog reproduced signal,
gate signal generating means for generating a gate signal as a binary signal corresponding to a transition in said analog equalized reproduced signal, and
binary reproduced signal generating means where said zero-cross signal and said gate signal are fed to, and for generating a binary reproduced signal based on a logical product of said zero-cross signal and said gate signal,
wherein said equalizing means is mounted ahead of at least said gate signal generating means.

2. An information reproducing device comprising:
zero-cross signal generating means for receiving an analog reproduced signal that was detected by irradiating a light beam upon an information recording medium whereon information is digitally recorded, for differentiating said analog reproduced signal and generating a differentiated signal, and for comparing said differentiated signal and the zero level of said differentiated signal and generating a zero-cross signal as binary signal,
equalizing means for generating an analog equalized reproduced signal by emphasizing the amplitude of frequency components contained in said analog reproduced signal,
clamping means for setting the upper limit level or the lower limit level of said analog equalized reproduced signal to a predetermined clamping level and for generating a clamped signal,
gate signal generating means for generating a gate signal as binary signal corresponding to a transition in said clamped signal, and
binary reproduced signal generating means where said zero-cross signal and said gate signal are fed to, and for generating a binary reproduced signal based on a logical product of said zero-cross signal and said gate signal,
wherein said clamping means is installed ahead of at least said gate signal generating means.

3. An information reproducing device as defined in claim 2, further comprising equalizing means for emphasizing the amplitude of high-frequency components contained in said analog reproduced signal; and
wherein said equalizing means is installed ahead of at least said clamping means, and
said clamping means receives an analog equalized reproduced signal whose amplitude was emphasized in frequency components contained in said analog equalized reproduced signal in said equalizing means, and derives and generates said clamped signal from said analog equalized reproduced signal.

4. An information reproducing device as defined in claim 1 or claim 3, wherein said zero-cross signal generating means comprises:
a CR differentiating circuit composed of a capacitor and a resistance connected to a direct current power source that supplies a constant potential including a ground potential, and that generates said differentiated signal, and
a comparator comprising a positive polarity input terminal where said differentiated signal generated in said CR differentiating circuit is fed to, and a negative polarity input terminal that is connected to said direct current power source; and wherein said zero-cross signal goes in a high level when said differentiated signal is beyond a zero level of said differentiated signal.

5. An information reproducing device as defined in claim 3, further comprising controlling means for having said information reproducing device execute recording/reproduction/erasing operations while controlling the rotation of said information recording medium such that said information recording medium rotates in Constant Angular Velocity;

wherein said equalizing means comprises:

a first equalizing section which gain with respect to the frequency of said analog reproduced signal supplied to said first equalizing section, is relatively large when said frequency is high, a second equalizing section which gain is relatively small when said frequency is high, and switching means for releasing from said equalizing means an output released by said first equalizing section and an output released by said second equalizing section in a switching manner, said switching means being arranged such that, based on a switching signal released by said controlling means, said switching means has said equalizing means release as said analog equalized reproduced signal a signal released by said first equalizing section when reproduction is executed in an inner area of said information recording medium where the linear velocity is relatively small, and said switching means has said equalizing means release as said analog equalized reproduced signal a signal released by said second equalizing section, when reproduction is executed in an outer area of said information recording medium where the linear velocity is relatively big.

6. An information reproducing device as defined in claim 5 further comprising:

reflected light splitting means for separating reflected lights obtained as a light beam is irradiated on a magneto-optical disk whereon information is digitally recorded according to a difference in magnetization direction on a vertical magnetic film, in accordance with a difference in the Kerr rotation angle of said reflected lights, photodetecting means for converting into electric signals the light intensities of the two types of said reflected lights that were separated, first differential amplifying means where two types of signals released by said photodetecting means in accordance with the two types of said reflected lights, are fed to, for determining the difference of and amplifying said two types of signals, and releasing two types of signals having mutually reverse polarities, and noise reducing means where said two types of signals released by said first differential amplifying means are fed to, for performing a noise reducing process with respect to information signals contained in said two types of signals;

wherein:

each of said first equalizing section and second equalizing section comprises second differential amplifying means where two types of analog reproduced signals having mutually reverse polarities released by said noise reducing means are fed to, and that amplifies and determines the difference of said two types of analog reproduced signals, a first gain control terminal and a second gain control terminal of said second differential amplifying means are connected to each other through a first resistance, a capacitor and a second resistance, said first resistance and said capacitor being connected in series, and said second resistance being connected in parallel with said first resistance and said capacitor, and equalizing characteristics of said first equalizing section and second equalizing section are respectively determined by the value of said first resistance, the value of second resistance and the value of said capacitor.

7. An information reproducing device as defined in claim 6, wherein:

(i) said clamping means comprises:

a first clamping section that receives a first analog equalized reproduced signal selected by said switching means among positive polarity output signals released by said second differential amplifying means comprised in each of said first equalizing section and second equalizing section, and released by said switching means, and a second clamping section that receives a second analog equalized reproduced signal selected by said switching means among negative polarity output signals released by said second differential amplifying means, and released by said switching means;

(ii) said first clamping section comprises:

a first n-p-n type transistor to which base a clamping control voltage employed for setting said clamping level is fed to, whose collector is connected to a first direct current power source, whose emitter is connected to a ground through a first resistance, and such that the output of said emitter coincides with the output of said first clamping section, and a second n-p-n type transistor to which base said first analog equalized reproduced signal is fed to, whose collector is connected to said first direct current power source, and whose emitter is connected to a ground through a second resistance, the emitter of said first transistor and the emitter of said second transistor being connected to each other through a first capacitor;

(iii) said second clamping section comprises:

a third p-n-p type transistor to which base said clamping control voltage is fed to, whose collector connected to a ground, whose emitter is connected to a second direct current power source through a third resistance, and such that the output of said emitter coincides with the output of said second clamping section, and a fourth p-n-p type transistor to which base said second analog equalized reproduced signal is fed to, whose collector is connected to a ground, and whose emitter is connected to said second direct current power source through a fourth resistance, the emitter of said third transistor and the emitter of said fourth transistor being connected to each other through a second capacitor;

(iv) the emitter of said first transistor and the emitter of said third transistor are connected to each other through a voltage divider composed of a fifth, a sixth and a seventh resistance, said fifth, sixth and seventh resistances being connected in series;

(v) the emitter of said first transistor sends to said voltage divider a signal derived from said first analog equalized reproduced signal where the lower limit level of a voltage for alternating current components contained in said first analog equalized reproduced signal is set to a value determined by subtracting the voltage between the base and the emitter of said first transistor from said clamping control voltage; and (vi) the emitter of said third transistor sends to said potential divider a signal derived from said second analog equalized reproduced signal where the upper limit level of a voltage for alternating current components contained in said second analog equalized reproduced signal is set to a value determined by adding said clamping control voltage and the voltage between the base and the emitter of said third transistor.

8. An information reproducing device as defined in claim 6, wherein said clamping means comprises:

a first clamping section that receives, via a first buffer amplifier, a first analog equalized reproduced signal selected by said switching means among positive polarity output signals released by said second differential amplifying means comprised in each of said first equalizing section and second equalizing section, and released by said switching means, and a second clamping section that receives, via a second buffer amplifier, a second analog equalized reproduced signal selected by said switching means among negative polarity output signals released by said second differential amplifying means, and released by said switching means;

wherein:

the output terminal of said first clamping section is connected to the output terminal of said first buffer amplifier through a first capacitor, is connected to the cathode of a first diode whose anode is connected to a ground, and is connected through a first resistance to a direct current power source that is negative with respect to said ground, the output terminal of said second clamping section is connected to the output terminal of said second buffer amplifier through a second capacitor, is connected to the anode of a second diode whose cathode is connected to a ground, and is connected through a second resistance to a direct current power source that is positive with respect to said ground, said first clamping section releases a first clamped signal derived from said first analog equalized reproduced signal whose lower limit level was set to a prescribed clamping level, in accordance with the amount of voltage drop from said ground toward said negative direct current power source in said first diode, said second clamping section releases a second clamped signal derived from said second analog equalized reproduced signal whose upper limit level was set to a predetermined clamping level, in accordance with the amount of voltage drop from said positive direct current power source toward the ground in said second diode.

9. An information reproducing device as defined in claim 7 or claim 8, wherein said gate signal generating means is a comparator that compares said first clamped signal, and said second clamped signal, generates said gate signal based on a comparison of said first clamped signal and said second clamped signal, and sends said gate signal to said binary reproduced signal generating means.

10. An information reproducing device as defined in claim 9, wherein said binary reproduced signal generating means comprises:

an inverter where said zero-cross signal released by said zero-cross signal generating means is fed to, and a flip-flop that is provided with a clock input terminal where an inverted signal derived from said zero-cross signal that was inverted in said inverter is fed to, a clear terminal where said gate signal released by said gate signal generating means is fed to, and an output terminal that releases said binary reproduced signal, and that generates said binary reproduced signal by determining the logical product of said inverted signal and said gate signal.

11. An information reproducing device as defined in claim 3, wherein said equalizing means comprises a differential amplifier provided with an inverting input terminal and a non-inverting input terminal, said inverting input terminal being connected to a first resistance, said first resistance being connected in parallel with a first capacitor and a second resistance, said first capacitor and said second resistance being connected in series, said non-inverting input terminal being connected to a ground through a third resistance, the output of said differential amplifier being fed back to said inverting input terminal through a fourth resistance, and said equalizing means generating said analog equalized reproduced signal derived from said analog reproduced signal whose amplitude was emphasized in frequency components.

12. An information reproducing device as defined in claim 11, wherein said clamping means comprises:

a first n-p-n type transistor to which base a clamping control voltage used for setting said clamping level is fed to, whose collector is connected to a first direct current power source, whose emitter is connected to a ground through a first resistance, and such that the output of said emitter coincides with the output of said first clamping section, and a second n-p-n type transistor to which base said analog equalized reproduced signal is fed to, whose collector is connected to said first direct current power source, and whose emitter is connected to said ground through a second resistance, the emitter of said first transistor and the emitter of said second transistor being connected to each other through a first capacitor, and wherein the emitter of said first transistor sends to said gate signal generating means a clamped signal derived from said first analog equalized reproduced signal where the lower limit level of a voltage for alternating current components contained in said analog equalized reproduced signal is set to a value determined by subtracting the voltage between the base and the emitter of said first transistor from said clamping control voltage.

13. An information reproducing device as defined in claim 2 further comprising equalizing means for emphasizing the amplitude of frequency components contained in said analog reproduced signal, and wherein:

said equalizing means is installed ahead of said clamping means and ahead of said zero-cross signal generating means, and an analog equalized reproduced signal whose amplitude was emphasized in frequency components by said equalizing means, is fed into said clamping means and is fed into said zero-cross signal generating means.

14. An information reproducing device as defined in claim 13, wherein:

said equalizing means comprises a differential amplifier provided with an inverting input terminal where said analog reproduced signal is fed to through a first resistance, and a non-inverting input terminal connected to a ground through a second resistance, said first resistance is connected in parallel with a first delaying element, a second delaying element and a third resistance, said first delaying element, said second delaying element and said third resistance being connected in series, said analog reproduced signal is fed into said non-inverting input terminal through said first delaying element and a fourth resistance, said first delaying element and said fourth resistance being connected in series, the output of said differential amplifier is fed back into said inverting input terminal through a fifth resistance, and said equalizing means is constituted by a cosine equalizing circuit whose group delay characteristic is uniform whereby a phase of said analog reproduced signal generated by said equalizing means is stable.

15. An information reproducing device as defined in claim 7 or claim 8 further comprising an AGC voltage generating section that generates a control voltage for adjusting an amplification degree in said first differential amplifier, and wherein the output of said clamping means is fed back into said AGC generating section, said amplification degree of said first differential amplifier being adjusted in accordance with the amplitude of a signal released by said first differential amplifier itself.

* * * * *